(12) United States Patent
Yu et al.

(10) Patent No.: US 10,970,104 B2
(45) Date of Patent: Apr. 6, 2021

(54) RESOURCE ACCESS METHOD APPLIED TO COMPUTER AND COMPUTER

(71) Applicant: Huawei Technologies Co., Ltd., Shenzhen (CN)

(72) Inventors: Zihao Yu, Beijing (CN); Jiuyue Ma, Beijing (CN); Yungang Bao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 78 days.

(21) Appl. No.: 16/251,883

(22) Filed: Jan. 18, 2019

(65) Prior Publication Data

US 2019/0155637 A1  May 23, 2019

Related U.S. Application Data

(63) Continuation of application No. PCT/CN2017/099337, filed on Aug. 28, 2017.

(30) Foreign Application Priority Data

Aug. 31, 2016 (CN) .......................... 201610797862.0

(51) Int. Cl.
*G06F 9/455* (2018.01)
*G06F 12/1027* (2016.01)
(Continued)

(52) U.S. Cl.
CPC ........ *G06F 9/45558* (2013.01); *G06F 12/109* (2013.01); *G06F 12/1027* (2013.01);
(Continued)

(58) Field of Classification Search
None
See application file for complete search history.

(56) References Cited

U.S. PATENT DOCUMENTS

2006/0224816 A1    10/2006  Yamada et al.
2008/0086729 A1*   4/2008   Kondoh ............... G06F 9/5077
                                                              718/1
(Continued)

FOREIGN PATENT DOCUMENTS

CN    101520738 A    9/2009
CN    101751284 A    6/2010
(Continued)

OTHER PUBLICATIONS

Foreign Communication From a Counterpart Application, European Application No. 17845377.5, Extended European Search Report dated Jun. 25, 2019, 7 pages.
(Continued)

*Primary Examiner* — Denise Tran
(74) *Attorney, Agent, or Firm* — Conley Rose, P.C.

(57) ABSTRACT

A resource access method applied to a computer and the computer, where the resource access method is performed by a resource controller which is used to implement resource virtualization. The method includes receiving a resource access request of a virtual machine (VM) for a resource, where the resource access request carries a resource virtual address and an identifier of the VM, translating the resource virtual address into a resource physical address using the identifier of the VM and based on a preset resource information mapping relationship, updating the resource virtual address in the resource access request using the resource physical address, and sending an updated resource access request to a to-be-accessed resource corresponding to the resource physical address in order to access the to-be-accessed resource.

20 Claims, 6 Drawing Sheets

(51) Int. Cl.
*G06F 12/109* (2016.01)
*G06F 12/1009* (2016.01)
*G06F 12/1081* (2016.01)

(52) U.S. Cl.
CPC ...... *G06F 12/1009* (2013.01); *G06F 12/1081* (2013.01); *G06F 2009/45575* (2013.01); *G06F 2009/45579* (2013.01); *G06F 2009/45583* (2013.01); *G06F 2212/151* (2013.01); *G06F 2212/657* (2013.01)

(56) References Cited

U.S. PATENT DOCUMENTS

| | | |
|---|---|---|
| 2010/0169968 A1 | 7/2010 | Shanbhogue et al. |
| 2011/0231630 A1 | 9/2011 | Dannowski et al. |
| 2013/0047157 A1 | 2/2013 | Suzuki |
| 2015/0254189 A1 | 9/2015 | Coppola et al. |
| 2015/0277949 A1 | 10/2015 | Loh et al. |
| 2015/0347051 A1 | 12/2015 | Kruglick |
| 2015/0378641 A1* | 12/2015 | Franke .................. G06F 3/067 710/74 |
| 2016/0179580 A1* | 6/2016 | Benedict ............... G06F 9/5016 718/104 |
| 2018/0210752 A1 | 7/2018 | Tang et al. |

FOREIGN PATENT DOCUMENTS

| | | |
|---|---|---|
| CN | 102306126 A | 1/2012 |
| CN | 102792286 A | 11/2012 |
| CN | 104375890 A | 2/2015 |
| CN | 105159753 A | 12/2015 |
| CN | 105210037 A | 12/2015 |
| CN | 106445628 A | 2/2017 |
| CN | 105874764 B | 3/2019 |

OTHER PUBLICATIONS

Machine Translation and Abstract of Chinese Publication No. CN101520738, Sep. 2, 2009, 13 pages.
Machine Translation and Abstract of Chinese Publication No. CN102306126, Jan. 4, 2012, 20 pages.
Machine Translation and Abstract of Chinese Publication No. CN106445628, Feb. 22, 2017, 43 pages.
Ma, J., et al, "Supporting Differentiated Services in Computers via Programmable Architecture for Resourcing-on-Demand (PARD)," ASPLOS, Mar. 14-18, 2015, pp. 131-141.
Barham, P., et al, "Xen and the Art of Virtualization," SOSP03, Oct. 19-22, 2003, 14 pages.
Foreign Communication From a Counterpart Application, PCT Application No. PCT/CN2017/099337, English Translation of International Search Report dated Nov. 27, 2017, 2 pages.

* cited by examiner

RESOURCE ACCESS METHOD APPLIED TO COMPUTER AND COMPUTER

CROSS-REFERENCE IO RELATED APPLICATIONS

This application is a continuation of International Patent Application No. PCT/CN2017/099337 filed on Aug. 28, 2017, which claims priority to Chinese Patent Application No. 201610797862.0 filed on Aug. 31, 2016. The disclosures of the aforementioned applications are hereby incorporated by reference in their entireties.

TECHNICAL FIELD

The present disclosure relates to the computer field, and in particular, to a resource access method applied to a computer and a computer.

BACKGROUND

Among computer technologies, virtualization is a resource management technology, where various physical resources (for example, a processor, a memory, network input/output (TO), and storage) of a computer are abstracted and translated before being presented. A barrier that physical resources cannot be divided is broken, and a user may use these resources in a better way than using an original configuration. Using a virtualization technology, a plurality of running environments for independent hardware may be simulated on a single hardware platform. This allows a plurality of operating systems to run simultaneously on one platform, and applications may run in mutually-independent spaces without affecting each other. Working efficiency of the computer is improved significantly.

In all current virtualization technologies, a virtualization function is provided by a virtual machine monitor (VMM). The VMM may be a hypervisor. The hypervisor is a meta operating system in a virtualized environment, and may access all hardware resources, including a disk and a memory, on a server. The hypervisor not only coordinates access to the hardware resources, but also applies protection between virtual machines (also referred to as VMs) to provide functions such as central processing unit (CPU) virtualization, memory virtualization, and network IO virtualization. When the server starts up and executes the hypervisor, the hypervisor loads operating systems of all VMs, and allocates appropriate amounts of memory, CPU, network interface card, disk and other hardware resources to each VM.

There are mainly two solutions for virtualization. A first one is a software-only virtualization solution. In many circumstances, a guest operating system communicates with hardware by way of a VMM, and the VMM determines about access of the guest operating system to all VMs on the system. In the software-only virtualization solution, a position of the VMM in a software suite is a position of an operating system in a conventional sense, while a position of an operating system is a position of an application in a conventional sense. Binary translation is required for this additional VMM communication layer, to provide interfaces to physical resources (such as a processor, a memory, a storage, and a network interface card), and functions such as hardware environment simulation. However, such translation inevitably increases complexity of the system. In addition, support for a guest operating system is limited by a capability of a virtual machine environment. Deployment of the guest operating system is subject to many limitations. For example, a 64-bit guest operating system is not supported by a VM. In the software-only solution, increased complexity of a software stack means that these environments are difficult to manage, adding to difficulty of ensuring system reliability and security.

A second solution is hardware-assisted virtualization. A CPU supporting virtualization has particularly optimized instruction sets to control virtualization processes. With these instruction sets, VMM performance can be improved easily to be much better than that of the software-only implementation of virtualization. The virtualization technology can provide a chip-based function, and improve the software-only solution using compatible VMM software. Virtualized hardware can provide a brand new architecture that allows operating systems to directly run on, such that binary translation is not required. This reduces relevant performance overheads, and greatly simplifies design of the VMM. The VMM can be compiled according to a general standard, providing more powerful performance. However, some recent surveys suggest that even though the hardware-assisted VMM solution is used, performance still declines when a program runs on the VM in comparison with when the program runs on a physical machine. For example, VMWARE ESXI with relatively good performance still causes program performance to decline by 5.4% on average, the encryption benchmark that introduces the most serious decline in performance even causes a performance decline of up to 18%, and XEN and kernel-based VM (KVM) also bring performance declines of 8.8% and 19.8% on average, respectively. Therefore, although reducing infrastructure overheads, using the virtualization technology also causes additional software costs and performance declines. As a result, overheads per unit load are greater in this case than deploying a corresponding Web application directly on a physical machine.

In addition, because currently, a VMM is compiled using software, running of the VMM requires a given quantity of hardware resources, and consequently a cache and a translation lookaside buffer (TLB) may be frequently accessed. This affects running performance of an application, resulting in a decline in comparison with program performance on a physical machine. Therefore, how to improve running performance on a VM is a hot topic of current research.

SUMMARY

A technical concern to be addressed by embodiments of the present disclosure is to provide a resource access method applied to a computer and a computer. A resource controller may be used to directly implement resource access by a virtual machine, thereby improving running performance of the virtual machine.

According to a first aspect, this application provides a resource access method applied to a computer, and the computer may be a computing device including a large quantity of resources. For example, the computing device is a data center server, a network server, a video server, a work station, or a personal computer. Resource types include but are not limited to a processor, a memory, or an IO device. The computer includes a resource and a resource controller. The resource controller is a hardware entity in the computer, and has a computing capability. For example, the resource controller is a memory controller, an IO device controller, or the like. One virtual machine runs on the computing device, and an identifier is allocated to the virtual machine to identify an identity of the virtual machine. The resource access method includes receiving, by the resource controller, a resource access request of the virtual machine for the resource, where the resource access request carries a resource virtual address and the identifier of the virtual machine. The resource virtual address represents an address of the resource in the virtual machine, and a resource physical address represents an actual address of the resource in the computer. A resource information mapping relationship represents a correspondence between an identifier of a virtual machine and attribute information of a resource allocated to the virtual machine, for example, a correspondence between an identifier of a virtual machine and a memory physical address space and a memory physical address space base address that are of a memory, a correspondence between an identifier of a virtual machine and an IO device physical address space and an IO device physical address space base address that are of an IO device, or a correspondence between an identifier of a virtual machine and a device number of at least one IO device allocated to the virtual machine. The resource controller translates the resource virtual address into a resource physical address using the identifier of the virtual machine and based on the resource information mapping relationship. The resource controller updates the resource virtual address in the resource access request using the resource physical address, where an updated resource access request carries the resource physical address. The resource controller sends the updated resource access request to a to-be-accessed resource corresponding to the resource physical address in order to access the to-be-accessed resource. For example, the resource access request is a memory access request, the to-be-accessed resource is a memory, and a read operation or a write operation is performed on the memory, or the resource access request is an IO device access request, the to-be-accessed resource is an TO device, and a read operation or a write operation is performed on the IO device.

In the foregoing embodiment, the resource controller receives the resource access request sent by the virtual machine, and translates the resource virtual address into the resource physical address using the identifier of the virtual machine carried in the resource access request and based on the resource information mapping relationship. In this way, compared with implementing resource virtualization using the existing software-based method, implementing a resource virtualization function using the computing capability of the resource controller itself saves intermediate layer processing, improves running performance of the virtual machine, and reduces physical resource occupation such that more physical resources can be allocated to the virtual machine.

In a possible implementation, the resource information mapping relationship includes a processing unit mapping relationship. The processing unit mapping relationship represents a mapping relationship between a processing unit and a virtual machine. One processing unit is uniquely mapped to one virtual machine. An identifier of a processing unit may be bound to an identifier of a virtual machine to represent a mapping relationship between the processing unit and the virtual machine. Before the receiving, by the resource controller, a resource access request sent by the virtual machine for the resource, when an application on the virtual machine performs an operation, a resource needs to be referred to as to perform the corresponding operation, where for the virtual machine, the referred to as resource is a virtual resource, a processing unit bound to the virtual machine generates the resource access request carrying the resource virtual address, and the processing unit obtains, based on the preset processing unit mapping relationship, the identifier of the virtual machine associated with an identifier of the processing unit. The processing unit adds the identifier of the virtual machine to the resource access request, such that the resource access request now carries the identifier of the virtual machine and the resource virtual address. The processing unit sends, to the resource controller, a resource access request obtained after the identifier of the virtual machine is added. When the resource controller includes a plurality of controllers, each of the plurality of controllers corresponds to an address space, and the processing unit may determine, based on an address space in which the resource virtual address in the resource access request is located, to which controller the resource access request is to be sent.

In the foregoing embodiment, the processing unit adds, based on the preset processing unit mapping relationship, the identifier of the virtual machine to the resource access request, and then sends the resource access request to the resource controller, such that the resource controller determines, based on the identifier of the virtual machine, the to-be-accessed resource for the resource access request.

In a possible implementation, the resource controller is a memory controller, the resource virtual address is a memory virtual address, the resource physical address is a memory physical address, the to-be-accessed resource is a memory, and the resource information mapping relationship includes a memory address mapping relationship. The memory address mapping relationship represents a correspondence between a memory virtual address and a memory physical address of the virtual machine. The step of translating, by the resource controller, the resource virtual address into a resource physical address using the identifier of the virtual machine and based on the resource information mapping relationship includes finding, by the memory controller by querying the preset memory address mapping relationship, a memory virtual address space base address and a memory physical address space base address that are associated with the identifier of the virtual machine, where the memory virtual address space base address represents an offset address of a memory virtual address space of a virtual memory of the virtual machine, and the memory physical address space represents an offset address of a memory physical space of a physical memory allocated to the virtual machine, and obtaining, by the memory controller, the memory physical address based on the memory virtual address, the memory virtual address space base address, and the memory physical address space base address.

In the foregoing embodiment, the memory controller translates the memory virtual address into the memory physical address based on the memory virtual address space base address and the memory physical address space base address, thereby improving translation efficiency, and reducing occupation of memory space.

With reference to the possible implementations of the first aspect, in a third possible implementation, the obtaining the memory physical address based on the memory virtual address, the memory virtual address space base address, and the memory physical address space base address includes translating the memory virtual address into the memory physical address based on a formula, paddr=vaddr−base+rebase, where paddr is the memory physical address, vaddr is the memory virtual address, base is the memory virtual address space base address, and rebase is the memory physical address space base address.

In the foregoing embodiment, the memory controller translates the memory virtual address into the memory physical address based on the foregoing operation relation. This helps improve operation efficiency.

In a possible implementation, a memory controller receives a memory access request sent by a processing unit, where the memory access request carries a memory virtual address. The memory controller obtains a memory virtual address space of the virtual machine, where the memory virtual address space represents an address range of the virtual memory of the virtual machine. The memory controller determines whether the memory virtual address is located in the memory virtual address space, and if the memory virtual address is located in the memory virtual address space, the memory controller translates the memory virtual address into a memory physical address based on the preset memory address mapping relationship, updates, based on the memory physical address, the memory virtual address in the memory access request, and sends an updated memory access request to the memory.

A method for obtaining the memory virtual address space of the virtual machine by the controller is as follows. The memory controller finds, by querying the preset memory address mapping relationship, a memory virtual address space base address and a memory virtual address space length that are associated with the identifier of the virtual machine, where the memory virtual address space length represents a length of an address space of the virtual memory of the virtual machine. For example, base is the memory virtual address space base address, len is the memory virtual address space length, base represents a minimum address of the memory virtual address space, base+len represents a maximum address of the memory virtual address space, and the memory virtual space of the virtual machine may be represented by [base, base+len].

In the foregoing embodiment, through determining performed for the memory virtual address in the memory access request, the memory virtual address in the memory access request can be prevented from exceeding the memory virtual address space of the virtual machine. This avoids unauthorized cross-border access, and reduces accessed resources.

In a possible implementation, the resource controller is an IO device controller, the resource virtual address is an IO device virtual address, the resource physical address is an IO device physical resource address, the to-be-accessed resource is an IO device, and the resource information mapping relationship includes an IO device mapping relationship and an IO device address mapping relationship. The IO device mapping relationship represents a mapping relationship between a virtual machine and at least one IO device allocated to the virtual machine. An identifier of a virtual machine may be used to associate with a device number of at least one IO device. The IO device address mapping relationship represents an association relationship between an IO device virtual address and an IO device physical address of a virtual machine. The step of translating, by the resource controller, the resource virtual address into a resource physical address using the identifier of the virtual machine and based on the resource information mapping relationship includes finding, by the IO device controller by querying the preset device mapping relationship, a device number of at least one IO device associated with the identifier of the virtual machine, where the at least one IO device is an IO resource allocated to the virtual machine, the device number is used to represent an identity of the device, device numbers of the at least one IO device are different from each other, and for the virtual machine, each of the at least One IO device has a different IO device virtual address space, obtaining, by the IO device controller, an IO device virtual address space associated with each of the at least one IO device, determining, by the IO device controller, in which IO device virtual address space the IO device virtual address is located, using an IO device virtual address space in which the IO device virtual address is located as a target IO device virtual address space, setting a device number associated with the target IO device virtual address space to a target device number, finding, by the IO device controller by querying the preset IO device address mapping relationship, an IO device virtual address space base address and an IO device physical address space base address that are associated with the target device number, and translating the IO device virtual address into the IO device physical address based on the IO device virtual address space base address and the IO device physical address space base address.

In the foregoing embodiment, the IO device controller receives the resource access request sent by a processing unit, determines the target IO device and an IO device address translation rule based on the IO device virtual address and the identifier of the virtual machine that are carried in the resource access request, and translates the IO device virtual address according to the rule. In this way, an IO device virtualization function can be implemented directly using a computing capability of the IO device controller. Compared with implementing IO device virtualization using the existing software-based method, this saves intermediate layer processing and improves running performance of the virtual machine. In addition, physical resource occupation is reduced such that more physical resources can be allocated to the virtual machine.

In a possible implementation, obtaining an IO device virtual address space associated with each of the device number of the at least one IO device includes finding, by the IO device controller by querying the preset IO device address mapping relationship, an IO device virtual address space base address and an IO device virtual address space length that are associated with each of the device number of the at least one IO device, and determining, based on the IO device virtual address space base address and the IO device virtual address space length, the IO device virtual address space associated with each of the device number of the at least one IO device. One IO device is used as an example to describe a method for computing the IO device virtual address space. An IO device virtual address space base address associated with a device number of the IO device is base, an IO device virtual address space length is len, base is a minimum address of an IO device virtual address space of the IO device, base+len is a maximum address of the IO device virtual address space of the IO device, and the IO device virtual address space associated with the device number of the IO device may be represented by [base, base+len].

In a possible implementation, translating the IO device virtual address into the IO device physical address based on the IO device virtual address space base address and the IO device physical address space base address includes translating the IO device virtual address into the IO device physical address based on a formula, paddr=vaddr−base+rebase, where paddr is the IO device physical address, vaddr is the IO device virtual address, base is the IO device virtual address space base address, and rebase is the IO device physical address space base address.

In a possible implementation, the resource information mapping relationship includes an interrupt mapping relationship, and the interrupt mapping relationship represents a correspondence between a virtual interrupt of a virtual machine and a physical interrupt of an IO device allocated to the virtual machine. The IO device controller receives a physical interrupt request sent by any one of the at least one IO device allocated to the virtual machine, where the interrupt number represents a physical interrupt identity, such as a network adapter interrupt, a disk interrupt, or a serial port interrupt. The physical interrupt request carries a physical interrupt number and a device number. The IO device controller finds, by querying the preset IO device mapping relationship, an identifier of a virtual machine associated with the device number, finds, by querying the preset interrupt mapping relationship, a virtual interrupt number associated with the physical interrupt number, updates, based on the virtual interrupt number, the physical interrupt number in the physical interrupt request, and sends an updated physical interrupt request to the virtual machine.

In the foregoing embodiment, the IO device controller implements an interrupt routing function, such that interrupt virtualization is implemented without help of a software-based method. This saves intermediate layer processing loss, and helps improve running performance of the virtual machine.

In a possible implementation, the computer further includes a resource manager, and the resource manager is mainly configured to create the virtual machine and configure the resource information mapping relationship. The resource manager selects a physical resource from a physical resource pool of the computer, where the selected physical resource includes but is not limited to a processing unit, a memory, and an IO device. The resource manager creates the virtual machine based on the selected physical resource. An address of the selected physical resource in the virtual machine is a resource virtual address, and an address of the selected physical resource in the computer is a resource physical address. The resource manager allocates an identifier to the virtual machine, and the identifier is used to uniquely represent an identity of the virtual machine. When the virtual machine is removed, the resource manager may reclaim the identifier of the virtual machine. Physical resources allocated to different virtual machines may not be shared. That is, the physical resources allocated to the virtual machines are isolated from each other. The resource manager generates, based on the identifier of the virtual machine and attribute information of the physical resource allocated to the virtual machine, the resource information mapping relationship. The attribute information of the physical resource includes but is not limited to one or more of a resource physical address space, a resource physical address space base address, a resource identifier, or a physical address space length of the resource.

In the foregoing embodiment, the resource manager creates the virtual machine based on the selected physical resource, generates, based on the identifier of the virtual machine and the attribute information of the physical resource allocated to the virtual machine, the resource information mapping relationship, and notifies the resource information mapping relationship to the resource controller. This implementation may replace the existing software-based method to create a virtual machine and allocate a resource to the virtual machine, and by implementing the foregoing operation using a computing capability of the resource manager, a computer device resource does not need to be occupied.

In a possible implementation, the physical resource includes a processing unit, and the attribute information of the physical resource includes an identifier of the processing unit, where the identifier of the processing unit is used to uniquely represent an identity of the processing unit. That the resource manager generates, based on the identifier of the virtual machine and attribute information of a physical resource, the resource information mapping relationship includes associating, by the resource manager, the identifier of the virtual machine with the identifier of the processing unit to generate the processing unit mapping relationship, where one virtual machine is uniquely bound to one processing unit.

In a possible implementation, the physical resource includes a memory, the attribute information of the physical resource includes a memory physical address space base address of a physical address space of the memory, and the resource information mapping relationship includes a memory address mapping relationship. The memory physical space represents an address range of a memory space allocated to the virtual machine, and the memory physical address space base address represents an offset address of the memory physical address space.

In a possible implementation, the resource information mapping relationship includes the IO device address mapping relationship, where the IO device address mapping relationship represents a mapping relationship between an IO device virtual address, of an IO device allocated to the virtual machine, in the virtual machine and a physical address of the IO device in the computer. That the resource manager generates, based on the identifier of the virtual machine and attribute information of a resource, the resource information mapping relationship includes obtaining a device number corresponding to each of at least one IO device allocated to the virtual machine, and binding the identifier of the virtual machine to the device number of the at least one IO device to generate the IO device mapping relationship. The resource manager obtains an IO device physical address space base address corresponding to each of the at least one IO device allocated to the virtual machine, where a quantity of IO device virtual address space base addresses presented in the virtual machine equals a quantity of the at least one IO device, obtains an IO device virtual address space base address and an IO device virtual address space length of the virtual machine, and binds the identifier of the virtual machine, the IO device virtual address space of the virtual machine, and the IO device virtual address space length of the virtual machine, to the physical address space base address corresponding to each of the at least one IO device to generate the IO device address mapping relationship.

According to a second aspect, this application provides a computer, and the computer includes a resource manager, a resource, and a resource controller, where the resource manager is configured to select a physical resource from the resource, and create a virtual machine based on the selected physical resource, allocate an identifier to the virtual machine, generate, based on the identifier of the virtual machine and attribute information of the selected physical resource, a resource information mapping relationship, and send the resource information mapping relationship to the resource controller, and the resource controller is configured to receive a resource access request of the virtual machine for the resource, where the resource access request carries a resource virtual address and the identifier of the virtual machine, translate the resource virtual address into a resource physical address using the identifier of the virtual machine and based on the resource information mapping relationship, update the resource virtual address in the resource access request using the resource physical address, and send an updated resource access request to a to-beaccessed resource corresponding to the resource physical address in order to access the to-be-accessed resource.

In the foregoing embodiment, the resource controller receives the resource access request sent by the processing unit, and translates the resource virtual address into the resource physical address using the identifier of the virtual machine carried in the resource access request and based on the resource information mapping relationship. In this way, compared with implementing resource virtualization using the existing software-based method, implementing a resource virtualization function using the computing capability of the resource controller itself saves intermediate layer processing, improves running performance of the virtual machine, and reduces physical resource occupation such that more physical resources can be allocated to the virtual machine.

In a possible implementation of this application, the resource manager includes a first processor, a first storage, and a first transceiver, the resource controller includes a second processor, a second storage, a second transceiver, and a buffer, and the resource includes a processing unit, a memory, and an IO device, and the first processor is configured to select the physical resource from the resource, and create the virtual machine based on the selected physical resource, allocate the identifier to the virtual machine, generate, based on the identifier of the virtual machine and the attribute information of the resource, the resource information mapping relationship, and store the resource information mapping relationship into the first storage, where the resource information mapping relationship represents a mapping relationship between an identifier of a virtual machine and attribute information of a physical resource allocated to the virtual machine, the identifier of the virtual machine is used to represent an identity of the virtual machine, and the attribute information of the resource includes but is not limited to one or more of a memory virtual address space, a memory virtual address space base address, an IO device virtual address space, and an IO device virtual address space base address, the first transceiver is configured to send the resource information mapping relationship to the buffer, the second processor is configured to fetch the resource information mapping relationship from the buffer, and store the resource information mapping relationship into the second storage, the buffer is configured to receive the resource access request sent by the processing unit, where the resource access request carries the resource virtual address and the identifier of the virtual machine, the second processor is configured to fetch the resource access request from the buffer, translate the resource virtual address into the resource physical address using the identifier of the virtual machine and based on the resource information mapping relationship stored in the second storage, and update the resource virtual address in the resource access request using the resource physical address, and the second transceiver is configured to send the updated resource access request to the to-be-accessed resource corresponding to the resource physical address in order to access the to-be-accessed resource.

In a possible implementation, the resource information mapping relationship includes a processing unit mapping relationship, the processing unit includes a register group, and the register group stores the processing unit mapping relationship, the processing unit mapping relationship represents a mapping relationship between an identifier of a virtual machine and an identifier of a processing unit, the processing unit represents a core having an operation function in a multi-core processor, and the processing unit is configured to generate the resource access request based on a request of the virtual machine, where the resource access request carries the resource virtual address, obtain, based on the processing unit mapping relationship stored in the register group, an identifier of the virtual machine associated with an identifier of the processing unit, add the identifier of the virtual machine to the resource access request, and send to the buffer, a resource access request obtained after the identifier of the virtual machine is added.

In a possible implementation, the resource controller is a memory controller, the resource virtual address is a memory virtual address, the resource physical address is a memory physical address, the to-be-accessed resource is a memory, and the resource information mapping relationship includes a memory address mapping relationship, where the memory address mapping relationship represents a correspondence between an identifier of a virtual machine and address information of a memory allocated to the virtual machine, and the address information of the memory includes a virtual address and a physical address of the memory, for example, a memory virtual address space, a memory physical address space, a memory virtual address space base address, a memory physical address space base address, or a memory virtual address space length, and the second processor includes a first controller configured to find, by querying the memory address mapping relationship stored in the second storage, a memory virtual address space base address and a memory physical address space base address that are associated with the identifier of the virtual machine, and a first operator configured to obtain the memory physical address based on the memory virtual address, the memory virtual address space base address, and the memory physical address space base address.

In a possible implementation, the first operator is further configured to translate the memory virtual address into the memory physical address based on a formula, paddr=vaddr-base+rebase, where paddr is the memory physical address, vaddr is the memory virtual address, base is the memory virtual address space base address, and rebase is the memory physical address space base address.

In a possible implementation, the resource controller is an IO device controller, the resource virtual address is an IO device virtual address, the resource physical address is an IO device physical address, the to-be-accessed resource includes at least one IO device, and the resource information mapping relationship includes an IO device mapping relationship and an IO device address mapping relationship, where the IO device address mapping relationship represents a correspondence between an identifier of a virtual machine and address information of an IO device allocated to the virtual machine, and the address information of the IO device includes a virtual address and a physical address, for example, an IO device virtual address space, an IO device physical address space, an IO device virtual address space base address, or an IO device physical address space base address, and the second processor includes a second controller configured to find, by querying the IO device mapping relationship stored in the second storage, a device number of at least one IO device associated with the identifier of the virtual machine, find, by querying the IO device address mapping relationship stored in the second storage, an IO device virtual address space base address and an IO device virtual address space length that are associated with each of the device number of the at least one IO device, determine, based on the IO device virtual address space base address and the IO device virtual address space length, an IO device virtual address space associated with each of the device number of the at least one IO device, determine an IO device virtual address space in which the IO device virtual address is located, and set a device number associated with the IO device virtual address space to a target device number, and find, by querying the preset IO device address mapping relationship, an IO device virtual address space base address and an IO device physical address space base address that are associated with the target device number, and a second operator configured to translate the IO device virtual address into the IO device physical address based on the IO device virtual address space base address and the IO device physical address space base address.

In a possible implementation, the second operator is further configured to translate the IO device virtual address into the IO device physical address based on a formula paddr=vaddr-base+rebase, where paddr is the IO device physical address, vaddr is the IO device virtual address, base is the IO device virtual address space base address, and rebase is the IO device physical address space base address.

In a possible implementation, the resource information mapping relationship includes an interrupt mapping relationship, and the interrupt mapping relationship represents a correspondence between an identifier of a virtual machine and an interrupt request of an IO device allocated to the virtual machine, where the interrupt request includes a virtual interrupt request and a physical interrupt request, and the IO device controller further includes an interrupt controller, where the buffer is configured to receive a physical interrupt request sent by any one of the at least one IO device, where the physical interrupt request carries a device number and a physical interrupt number of the IO device, and the interrupt controller is configured to find, by querying the preset IO device mapping relationship, an identifier of a virtual machine associated with the device number, find, by querying the preset interrupt mapping relationship, a virtual interrupt number associated with the physical interrupt number, update, based on the virtual interrupt number, the physical interrupt number in the physical interrupt request, and send an updated physical interrupt request to the virtual machine.

In a possible design, the physical resource includes a processing unit, and the attribute information of the physical resource includes an identifier of the processing unit, and the first processor is configured to generate the processing unit mapping relationship based on the identifier of the virtual machine and the identifier of the processing unit, and store the processing unit mapping relationship into the register group of the processing unit.

In a possible implementation, the resource includes the memory, the attribute information of the resource includes the memory physical address space base address of the memory physical address space, and the resource information mapping relationship includes a memory address mapping relationship, and the first processor is configured to obtain the memory physical address space base address allocated to the virtual machine, and obtain the memory virtual address space base address of the virtual machine, generate the memory address mapping relationship based on the identifier of the virtual machine, the memory virtual address space base address, and the physical address space base address, and store the memory address mapping relationship into the first storage.

In a possible implementation, the physical resource includes at least one IO device, the attribute information of the resource includes a physical interrupt number of the at least one IO device, and the resource information mapping relationship includes the interrupt mapping relationship, and the first processor is configured to obtain a physical interrupt number of at least one IO device allocated to the virtual machine, and obtain the identifier and a virtual interrupt number of the virtual machine, generate the interrupt mapping relationship based on the identifier of the virtual machine, the virtual interrupt number of the virtual machine, and the physical interrupt number of the at least one IO device, and store the interrupt mapping relationship into the first storage.

In a possible implementation, the resource information mapping relationship includes the IO device address mapping relationship, and the first processor is further configured to obtain a device number corresponding to each of the at least one IO device, and bind the identifier of the virtual machine to the device number corresponding to each of the at least one IO device, to generate the IO device mapping relationship, and obtain a physical address space base address corresponding to each of the at least one IO device, and generate the IO device address mapping relationship, based on the identifier of the virtual machine, the IO device virtual address space base address of the virtual machine, the IO device virtual address space length of the virtual machine, and the IO device physical address space base address corresponding to each of the at least one IO device, and store the IO device address mapping relationship into the first storage.

BRIEF DESCRIPTION OF DRAWINGS

The following briefly describes the accompanying drawings describing some of the embodiments.

DESCRIPTION OF EMBODIMENTS

The following describes the technical solutions in the embodiments of the present disclosure with reference to the accompanying drawings in the embodiments of the present disclosure.

The embodiments of the present disclosure provide a resource access method and a computer. A virtual monitor in a computer can be removed, and resource virtualization is implemented using a computing capability of a resource controller itself. In this way, a virtual machine can directly run on a physical resource, and running performance of the virtual machine is improved.

Figure 1:
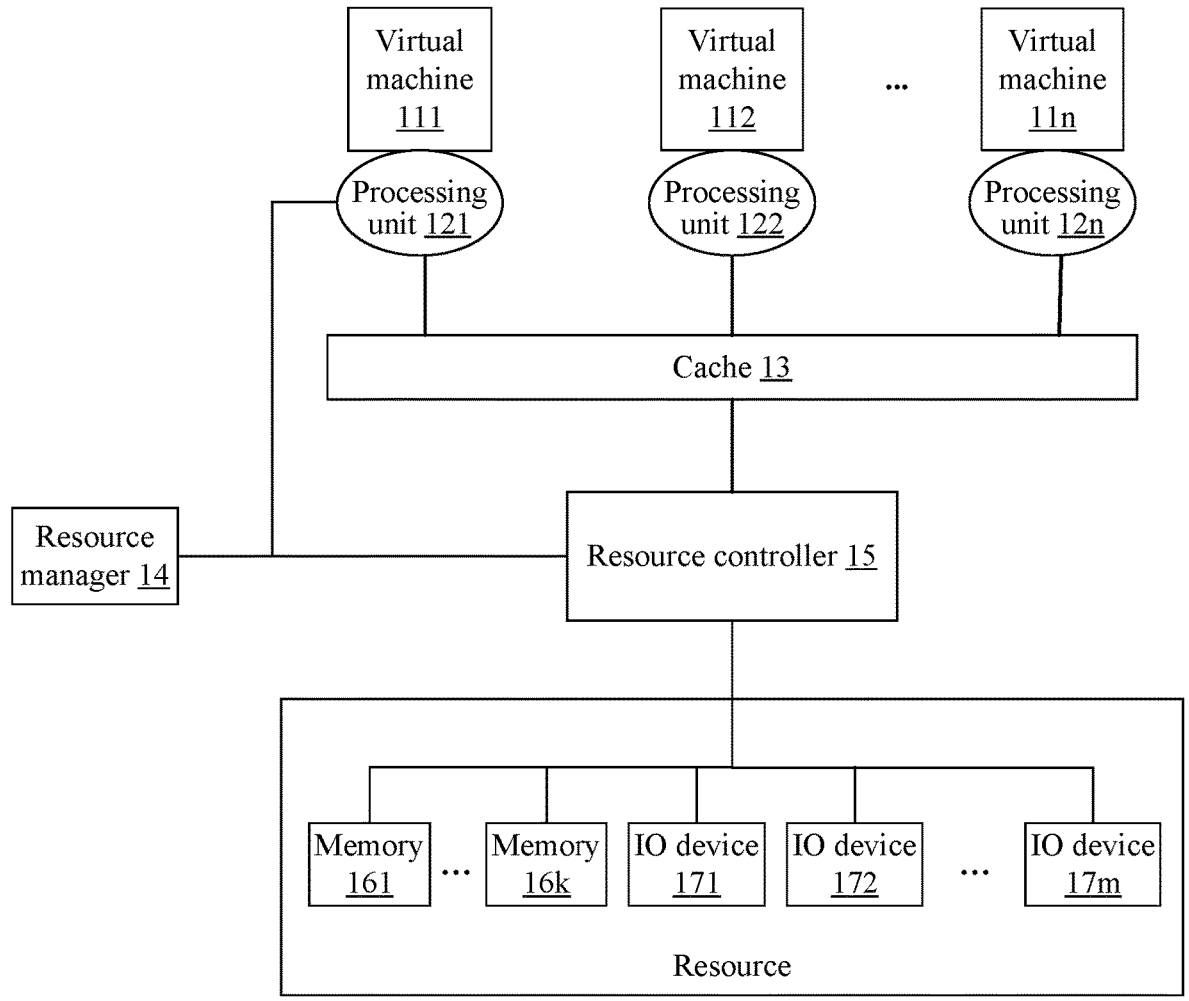
FIG. 1 is a schematic structural diagram of a computer according to an embodiment of the present disclosure.

Referring to FIG. 1, FIG. 1 is a schematic structural diagram of a computer according to an embodiment of the present disclosure. In this embodiment of the present disclosure, the computer includes a resource controller 15, a resource, and a resource manager 14. A plurality of virtual machines 111 to 11$n$ may be deployed on the computer. Each virtual machine occupies a specific quantity of resources, and each virtual machine is bound to one processing unit.

The resource may include a plurality of processing units 121 to 12n, a plurality of memories 161 to 16k, and a plurality of IO devices 171 to 17m, where values of m, n, and k are not limited in this embodiment.

A processing unit is a processor core in a multi-core CPU, and is configured to execute various operation commands such as a read operation and a write operation. Each processing unit may be provided with a cache 13, and the cache 13 may be a multi-level cache, for example, a level 1 cache, a level 2 cache, or a level 3 cache.

An IO device is configured to execute a basic IO operation, and a type of the TO device may be a disk, a network adapter, a printer, a scanner, or the like.

The resource controller 15 may be separately connected to the processing units 121 to 12n using the cache 13, and the resource controller 15 may be separately connected to the memories 161 to 16k and the IO devices 171 to 17m. The plurality of IO devices may be connected using an IO internetwork (also referred to as a southbridge). The resource controller 15 is a hardware entity, and has a computing capability. The resource controller 15 may be integrated into a processing unit, or may be an independent hardware entity. This is not limited in this embodiment. The resource controller 15 is configured to control a processing process between a virtual machine and a resource allocated to the virtual machine. For example, the resource controller 15 may include a memory controller and an IO device controller, the memory controller is configured to control a memory in the resource, and the IO device controller is configured to control an IO device in the resource.

The resource manager 14 is separately connected to the processing units 121 to 12n, and the resource manager 14 is connected to the resource controller 15. The resource manager 14 is configured to select some of physical resources from the resource for creating a virtual machine, and configure a resource information mapping relationship between the virtual machine and a physical resource allocated to the virtual machine.

The following describes an operating process of a computer using a life cycle of a virtual machine 111 as an example.

The resource manager 14 selects a physical resource from a resource, and the selected physical resource includes a processing unit 121, a memory 161, an IO device 171, and an IO device 172. The resource manager 14 may select one processing unit. The resource manager 14 may select a plurality of memories, or some of memory space of one memory. The resource manager 14 selects at least one IO device. The physical resource selected by the resource manager 14 is an idle physical resource that is not occupied by another virtual machine. The resource manager 14 creates the virtual machine 111 based on the selected physical resource, and the resource manager allocates an identifier to the virtual machine 111. The identifier is used to uniquely represent an identity of the virtual machine. The resource manager 14 obtains attribute information of the virtual machine 111 and attribute information of the resource allocated to the virtual machine 111. The attribute information of the virtual machine 111 includes but is not limited to one or more of the identifier of the virtual machine 111, a memory virtual address space of the virtual machine 111, a memory virtual address space length of the virtual machine 111, a memory virtual address space base address, an IO device virtual address space of the virtual machine 111, an IO device virtual address space length of the virtual machine 111, an IO device virtual address space base address of the virtual machine 111, and a virtual interrupt number of the virtual machine 111. The attribute information of the resource includes but is not limited to one or more of a memory physical address space, a memory physical address space base address, a memory physical address space length, an IO device physical address space, an IO device physical address space base address, an IO device physical address space length, a device number of an IO device, a physical interrupt number of the IO device, and an identifier of a processing unit. The resource manager 14 binds the attribute information of the virtual machine 111 to the attribute information of the resource allocated to the virtual machine 111 to generate a resource information mapping relationship. The resource manager 14 sends the resource information mapping relationship to the resource controller 15 and the processing unit 121. The processing unit 121 and the resource controller 15 receive the resource information mapping relationship, and may store the resource information mapping relationship into a high-speed storage, for example, a register group. When an application on the virtual machine 111 initiates an application request, the processing unit 121 bound to the virtual machine 111 generates a resource access request correspondingly, where the resource access request carries a resource virtual address of a to-be-accessed resource. The processing unit 121 reads the resource information mapping relationship in the high-speed storage, obtains the identifier of the virtual machine 111, and adds the identifier of the virtual machine 111 to the resource access request. Now the resource access request carries the resource virtual address and the identifier of the virtual machine 111. The processing unit 121 sends, to the resource controller 15, a resource access request obtained after the identifier of the virtual machine 111 is added. It should be noted that if the resource controller 15 includes a plurality of resource controllers, the high-speed storage in the processing unit 121 may store an address space of each of the plurality of resource controllers, and the processing unit 121 determines, based on an address space in which the resource virtual address is located, which resource controller the resource access request is to be sent to.

The resource controller 15 receives the resource access request carrying the resource virtual address and the identifier of the virtual address. The resource controller 15 may read a resource information mapping relationship stored in the high-speed storage, and translate the resource virtual address into an actual resource physical address in a computer using the identifier of the virtual machine. The resource controller 15 updates the resource virtual address in the resource access request using the resource physical address, and sends an updated resource access request to a to-be-accessed resource in order to access the to-be-accessed resource. For example, the to-be-accessed resource may be an IO device or a memory.

In implementation of the foregoing embodiment, the resource controller receives the resource access request sent by the virtual machine for the resource, and translates the resource virtual address into the resource physical address using the identifier of the virtual machine carried in the resource access request and based on the resource information mapping relationship. In this way, compared with implementing resource virtualization using the existing software-based method, implementing a resource virtualization function using the computing capability of the resource controller itself saves intermediate layer processing, improves running performance of the virtual machine, and reduces physical resource occupation such that more physical resources can be allocated to the virtual machine.

Figure 2:
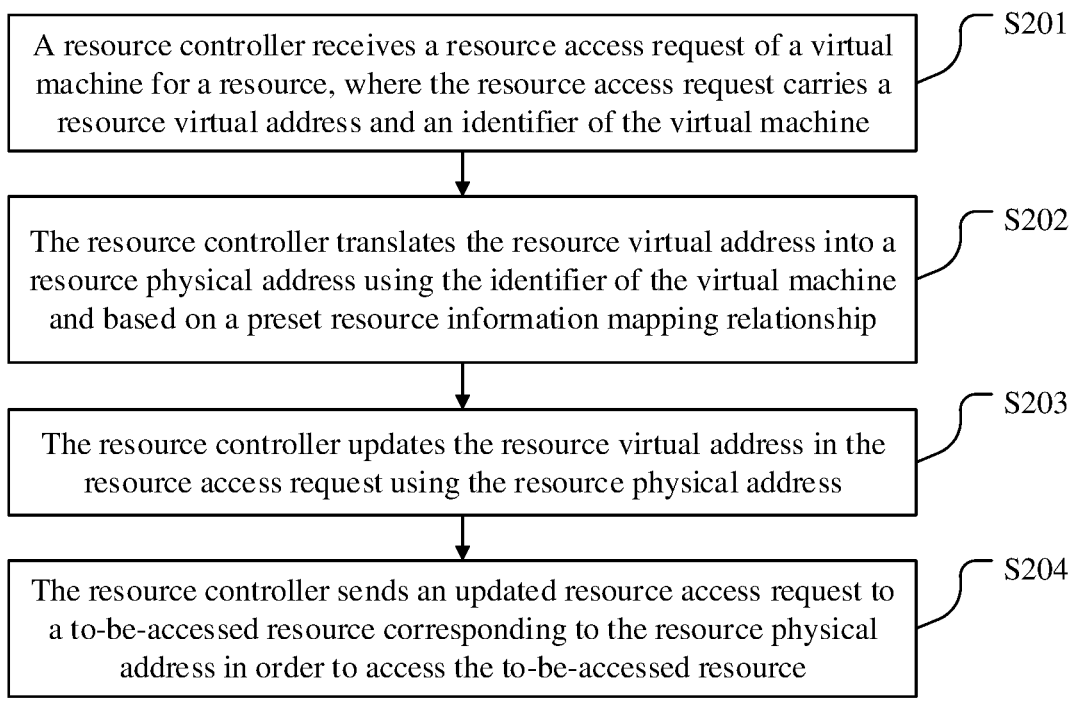
FIG. 2 is a schematic flowchart of a resource access method according to an embodiment of the present disclosure.

The following describes a data processing procedure that is implemented by configuring a control device in a computer, according to an embodiment of the present disclosure. A resource access method in this embodiment of the present disclosure may be implemented on the computer shown in FIG. 1. As shown in FIG. 2, the method includes the following steps.

Step S201. A resource controller receives a resource access request of a virtual machine for a resource, where the resource access request carries a resource virtual address and an identifier of the virtual machine.

Further, the computer includes the resource controller and the resource, and a virtual machine system runs on the computer. The resource controller is a hardware entity in the computer, and has a computing capability. The resource controller may be integrated into a processor, or may be integrated into a southbridge chip or another device. The resource controller may include a plurality of resource controllers of different types, and each type of resource controller is responsible for controlling a corresponding resource. For example, the resource controller includes a memory controller and an IO device controller, the memory controller is configured to control a processing process of a memory, and the IO device controller is configured to control a processing process of an IO device. The computer may be a computing device including a large quantity of resources, and the resources included in the computer include but are not limited to a processor, a memory, and an IO device. A processing unit is a processor core in a multi-core processor. When an application installed on the virtual machine initiates an application request and needs to access a resource allocated to the virtual machine, a processing unit bound to the virtual machine sends the resource access request to the resource controller. The resource access request carries the resource virtual address and the identifier of the virtual machine. The resource virtual address represents an address, of the resource, presented in the virtual machine, and the identifier of the virtual machine represents an identity of the virtual machine.

Step S202. The resource controller translates the resource virtual address into a resource physical address using the identifier of the virtual machine and based on a preset resource information mapping relationship.

Further, resource information mapping relationship represents a correspondence between attribute information of the resource in the virtual machine and attribute information of the resource in the computer. The attribute information of the resource in the virtual machine includes the identifier of the virtual machine, a resource virtual address space, a resource virtual address space length, and a resource virtual address space base address, and the attribute information of the resource in the computer includes a resource identifier, a resource physical address space, and a resource physical address space base address. The resource controller translates, based on the preset resource information mapping relationship, the resource virtual address in the resource access request into the resource physical address.

Step S203. The resource controller updates the resource virtual address in the resource access request using the resource physical address.

Further, the resource controller updates the resource virtual address in the resource access request based on the resource physical address obtained through translation in step S202, and now the resource access request carries the resource physical address.

Step S204. The resource controller sends the updated resource access request to a to-be-accessed resource corresponding to the resource physical address in order to access the to-be-accessed resource.

Further, the resource controller sends the resource access request carrying the resource physical address to the to-be-accessed resource corresponding to the resource physical address in order to access the to-be-accessed resource. For example, the resource controller sends a memory access request to a memory, to perform a read or write operation on a memory unit corresponding to a memory physical address. Alternatively, the resource controller sends an IO device access request to an IO device, to perform an input or output operation for an IO device corresponding to an IO device physical address.

Optionally, the resource information mapping relationship includes a processing unit mapping relationship, and before the resource controller receives the resource access request sent by the processing unit, the method further includes generating, by the processing unit based on a request of the virtual machine, the resource access request, where the resource access request carries the resource virtual address, obtaining, by the processing unit based on the preset processing unit mapping relationship, an identifier of the virtual machine associated with an identifier of the processing unit, adding, by the processing unit, the identifier of the virtual machine to the resource access request, and sending, by the processing unit to the resource controller, a resource access request obtained after the identifier of the virtual machine is added.

Further, the processing unit mapping relationship represents a mapping relationship between a virtual machine and a processing unit that runs on the computer. One virtual machine is bound to one processing unit. The processing unit mapping relationship may be stored in a high-speed storage. For example, the processing unit mapping relationship may be stored in a register group in a processor. The processing unit mapping relationship may be represented in a form of a mapping table or a two-dimensional array, or in another form. After receiving the application request sent by the application on the virtual machine, the processing unit generates the resource access request, where the resource access request carries the resource virtual address. The processing unit finds, by querying the processing unit mapping relationship, the identifier of the virtual machine associated with the identifier of the processing unit, and adds the identifier of the virtual machine to the resource access request. The processing unit sends, to the resource controller, a resource access request obtained after the identifier of the virtual machine is added.

For example, the processing unit mapping relationship is shown in Table 1.

TABLE 1

| Identifier of a virtual machine | Identifier of a processing unit |
|---|---|
| 1 | 1 |
| 2 | 2 |
| 3 | 3 |

It should be noted that the mapping relationship between a virtual machine and a processing unit is not limited to that shown in Table 1, and may be configured depending on a requirement. The processing unit receives a resource access request sent by a virtual machine, where an identifier of the processing unit is 1. The processing unit determines, based on the processing unit mapping relationship in Table 1, that an identifier of the virtual machine is 1, adds the identifier 1 of the virtual machine to the resource access request, and sends to the resource controller, a resource access request obtained after the identifier 1 of the virtual machine is added.

Optionally, the computer further includes a resource manager. Before the resource controller receives the resource access request sent by the processing unit, the method further includes selecting, by the resource manager, a physical resource from the resource, and creating the virtual machine based on the selected physical resource, allocating, by the resource manager, the identifier to the virtual machine, and generating, by the resource manager based on the identifier of the virtual machine and attribute information of the resource, the resource information mapping relationship.

Further, the resource manager is a hardware entity, and has a computing capability. The resource manager may be a System-On-a-Chip (SOC), an embedded card, a programmable logic device, or the like. This is not limited in the present disclosure. The resource manager does not need to occupy a computer resource. When one virtual machine needs to be deployed on the computer, the resource manager selects a physical resource from the resource in the computer, where the physical resource includes but is not limited to a processing unit, a memory, or an IO device. The resource manager creates the virtual machine based on the selected physical resource. The virtual machine runs on the allocated physical resource. The resource manager identifier allocates one identifier to the created virtual machine, where the identifier is used to uniquely represent an identity of the virtual machine. The resource manager obtains attribute information of the physical resource in the computer. This attribute information is physical attribute information, and includes but is not limited to a physical resource identifier, a physical address space, a physical address space base address, and a physical address space length. The resource manager obtains attribute information of the physical resource in the virtual machine. This attribute information is virtual attribute information, and includes but is not limited to the identifier of the virtual machine, a virtual address space, a virtual address space base address, and a virtual address space length. The resource manager generates, based on the identifier of the virtual machine and the attribute information of the resource, the resource information mapping relationship, and the resource manager sends the resource information mapping relationship to the resource controller.

In the foregoing embodiment, the resource controller receives the resource access request sent by the processing unit, and translates the resource virtual address into the resource physical address using the identifier of the virtual machine carried in the resource access request and based on the resource information mapping relationship. In this way, compared with implementing resource virtualization using the existing software-based method, implementing a resource virtualization function using the computing capability of the resource controller itself saves intermediate layer processing, improves running performance of the virtual machine, and reduces physical resource occupation such that more physical resources can be allocated to the virtual machine.

Figure 3:
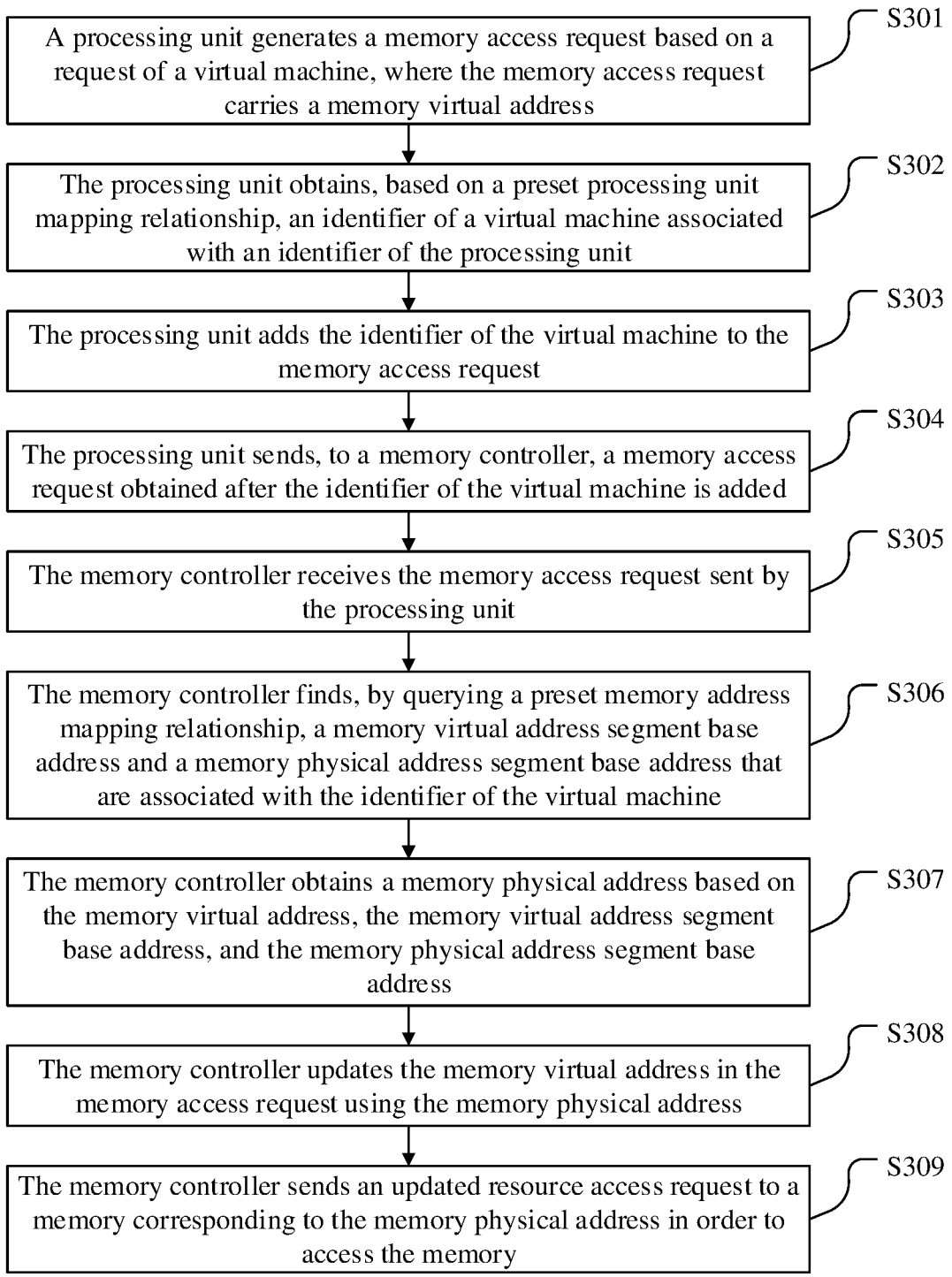
FIG. 3 is another schematic flowchart of a resource access method according to an embodiment of the present disclosure.

Referring to FIG. 3, FIG. 3 is another schematic flowchart of a resource access method applied to a computer according to an embodiment of the present disclosure. In this embodiment of the present disclosure, a resource information mapping relationship includes a processing unit mapping relationship and a memory address mapping relationship, and a resource controller includes a memory controller. The method includes the following steps.

Step S301. A processing unit generates a memory access request based on a request of a virtual machine, where the memory access request carries a memory virtual address.

Further, when an application on the virtual machine needs to access a memory, the processing unit generates a memory access request, where the memory access request carries a memory virtual address, and the memory virtual address represents an address, of a to-be-accessed memory unit, presented in the virtual machine.

Step S302. The processing unit obtains, based on a preset processing unit mapping relationship, an identifier of a virtual machine associated with an identifier of the processing unit.

Further, the processing unit mapping relationship represents a mapping relationship between an identifier of a virtual machine running on the computer and an identifier of a processing unit. Each virtual machine is bound to one processing unit. The processing unit mapping relationship may be represented in a form of a mapping table or a two-dimensional array, or in another form. The processing unit obtains, based on a preset processing unit mapping relationship, an identifier of a virtual machine associated with an identifier of the processing unit.

Step S303. The processing unit adds the identifier of the virtual machine to the memory access request.

Step S304. The processing unit sends, to a memory controller, a memory access request obtained after the identifier of the virtual machine is added.

Further, after the identifier of the virtual machine is added, the memory access request carries the identifier of the virtual machine and the memory virtual address.

Step S305. The memory controller receives the memory access request sent by the processing unit.

Further, the memory controller is a hardware entity in the computer, and has a computing capability. The memory controller may be built in a processor.

Step S306. The memory controller finds, by querying the preset memory address mapping relationship, a memory virtual address space base address and a memory physical address space base address that are associated with the identifier of the virtual machine.

Further, the memory address mapping relationship represents a mapping relationship between an identifier of a virtual machine and attribute information of a memory allocated to the virtual machine. The attribute information of the memory includes but is not limited to a memory virtual address space base address and a memory physical address space base address. The memory virtual address space base address represents an offset address of a virtual address space of the memory allocated to the virtual machine, and the memory virtual address space represents an address range of a virtual memory allocated to the virtual machine. The memory physical address space base address represents an offset address, of a physical address space of the memory allocated to the virtual machine, in the computer, and the memory physical address space represents a physical address range, of the memory allocated to the virtual machine, in the computer.

For example, the memory address mapping relationship is shown in Table 2.

TABLE 2

| Identifier of a virtual machine | Memory virtual address space base address of the virtual machine | Memory virtual address space length of the virtual address | Memory physical address space base address |
|---|---|---|---|
| ds-id1 | base1 | len1 | rebase1 |
| ds-id2 | base2 | len2 | rebase2 |
| ... | ... | ... | ... |
| ds-idn | basen | Lenn | rebasen |

It is assumed that the memory controller receives a memory access request, where an identifier of a virtual machine carried in the memory access request is $ds\text{-}id_1$, and that a memory virtual address carried in the memory access request is vaddr. The memory controller finds, by querying the memory address mapping relationship in Table 2, that a memory virtual address space base address associated with the identifier of the virtual machine is $base_1$, and that a memory physical address space base address associated with the identifier of the virtual machine is $rebase_1$.

Optionally, in a possible implementation of the present disclosure, the memory controller obtains a memory virtual address space of the virtual machine, where the memory virtual address space of the virtual machine represents a memory address range, of the memory allocated to the virtual machine, presented in the virtual machine. The memory controller determines whether the memory virtual address carried in the memory access request is located in the memory virtual address space. The memory controller cannot proceed to perform subsequent translation from the memory virtual address to a memory physical address unless the memory virtual address carried in the memory access request is located in the memory virtual address space.

Further, optionally, that the memory controller obtains a memory virtual address space of the virtual machine includes finding, by the memory controller by querying the preset memory address mapping relationship, a memory virtual address space base address and a memory virtual address space length that are associated with the identifier of the virtual machine, and obtaining, by the memory controller, the memory virtual address space based on the memory virtual address space base address and the memory virtual address space length.

Further, the controller uses the memory virtual address space base address as a minimum value of the memory virtual address space, and the controller sums the memory virtual address space base address and the memory virtual address space length to obtain a maximum value of the memory virtual address space.

For example, referring to the memory address mapping relationship shown in table 2, the identifier of the virtual machine carried in the memory access request is $ds\text{-}id_2$, and the memory controller finds, by querying Table 2, that the associated memory virtual address space base address is $base_2$, and the virtual address space length is $len_2$. In this case, the memory virtual address space of the virtual machine may be represented by $[base_2, base_2+len_2]$.

Step S307. The memory controller obtains a memory physical address based on the memory virtual address, the memory virtual address space base address, and the memory physical address space base address.

Further, the memory controller may subtract the memory virtual address space base address from the memory virtual address to obtain a difference, and sums the difference and the memory physical address space base address to obtain the memory physical address.

For example, the identifier of the virtual machine is $ds\text{-}id_n$, the memory virtual address is vaddr, and the controller finds, by querying the memory address mapping relationship in Table 2, that the memory virtual address space base address associated with the identifier of the virtual machine is $base_n$, and that the associated memory physical address space base address is $rebase_n$. In this case, the memory physical address $paddr=vaddr-base_n+rebase_n$.

Step S308. The memory controller updates the memory virtual address in the memory access request using the memory physical address.

Step S309. The memory controller sends an updated resource access request to a memory corresponding to the memory physical address in order to access the memory.

The following describes the resource access method applied to a computer in the present disclosure using a specific embodiment. A memory address mapping relationship is shown in Table 3.

TABLE 3

| Identifier of a virtual machine | Virtual address space base address of the virtual machine | Virtual address space length of the virtual machine | Physical address space base address |
|---|---|---|---|
| 2 | 0x80000000 | 0x20000000 | 0x100000000 |
| 3 | 0x80000000 | 0x10000000 | 0x200000000 |
| ... | ... | ... | ... |

The memory controller receives a memory access request, where an identifier of a virtual machine carried in the memory access request is 2, and a memory virtual address carried in the memory access request is vaddr=0x80001234. The memory controller finds, by querying Table 3 and based on the identifier 2 of the virtual machine, that an associated memory virtual address space base address is base=0x80000000, that an associated virtual address space base address length is len=0x200000000, and that an associated physical address space base address is rebase=0x00000000. The controller determines whether the memory virtual address is located in the memory virtual address space [0x80000000, 0x80000000+0x20000000] of the virtual machine, and if a determining result is yes, the memory controller obtains that the memory physical address is paddr=0x80001234−0x80000000+0x00000000=0x00001234. After obtaining the memory physical address resulting from translation, the memory controller may update the memory virtual address in the memory access request to the memory physical address, and the memory controller sends an updated memory access request to the memory.

Optionally, the to-be-accessed resource includes a memory, and the attribute information of the to-be-accessed resource includes a memory physical address space base address and a memory physical address space base address. The resource information mapping relationship includes a memory address mapping relationship, where the memory address mapping relationship represents a mapping relationship between an identifier of a virtual machine and attribute information of a memory allocated to the virtual machine. Before the memory controller receives the memory access request sent by the processing unit, the method further includes obtaining, by the resource manager, a memory physical address space base address of the virtual machine, and obtaining a memory virtual address space base address of the virtual machine, and generating, by the resource manager, the memory address mapping relationship based on the identifier of the virtual machine, the memory virtual address space base address, and the memory physical address space base address.

In the foregoing embodiment, the memory controller receives the memory access request sent by the processing unit, and translates the memory virtual address into the memory physical address using the identifier of the virtual machine carried in the memory access request and based on the memory address mapping relationship. In this way, compared with implementing resource virtualization using the existing software-based method, implementing a resource virtualization function using the computing capability of the resource controller itself saves intermediate layer processing, improves running performance of the virtual machine, and reduces physical resource occupation such that more physical resources can be allocated to the virtual machine.

Figure 4A:
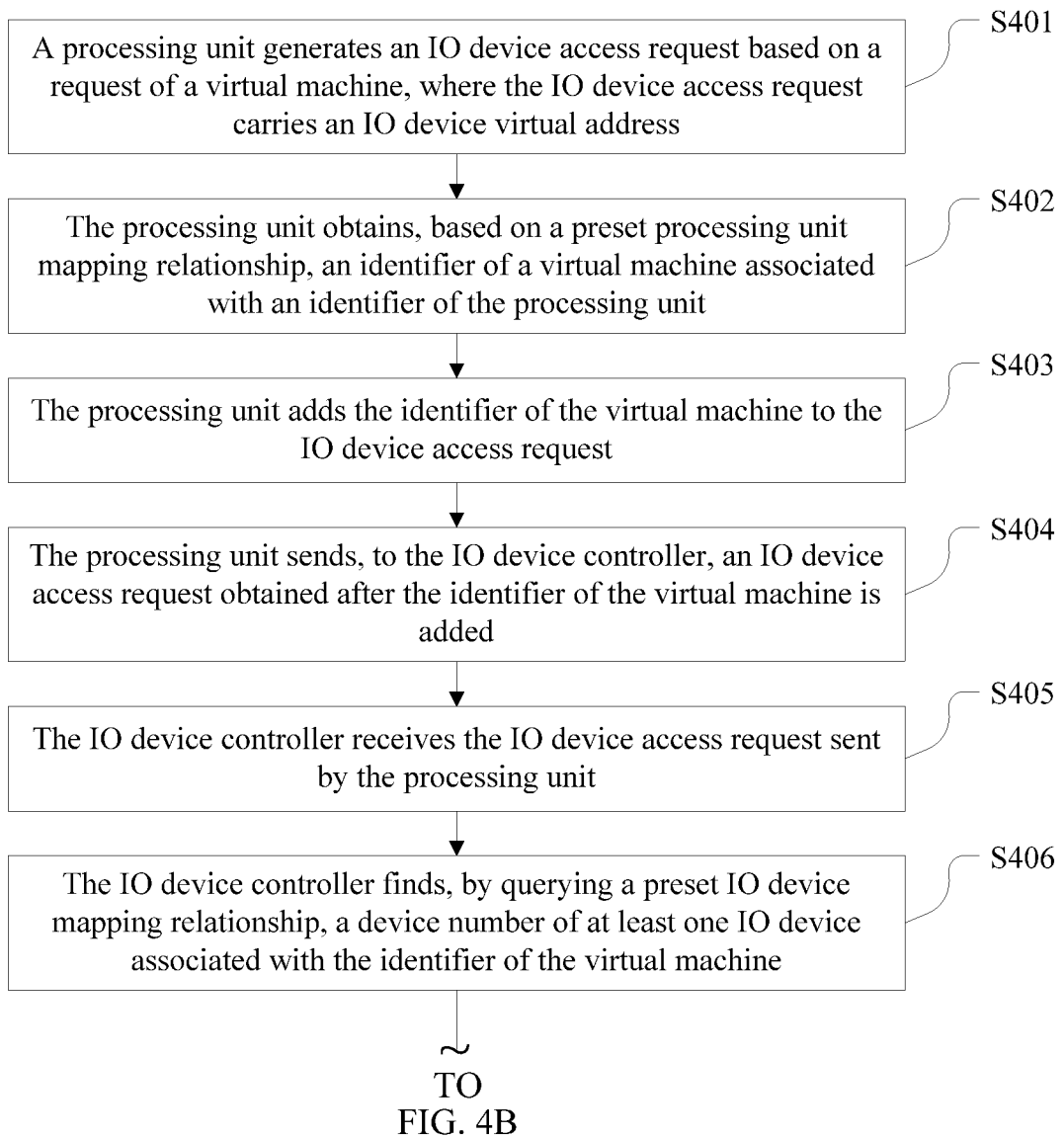
FIG. 4A and FIG. 4B are another schematic flowchart of a resource access method according to an embodiment of the present disclosure.
Figure 4B:
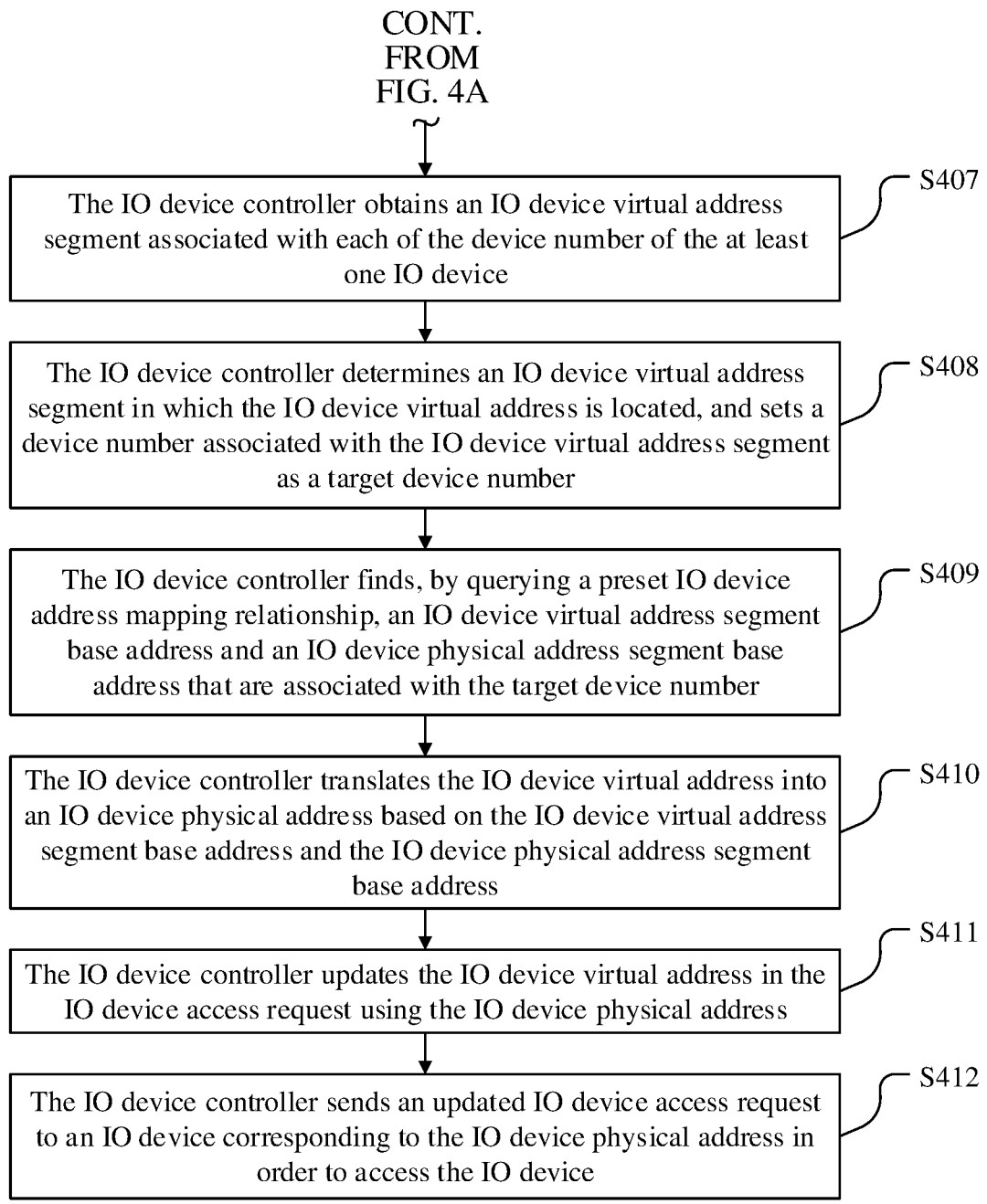

Referring to FIG. 4A and FIG. 4B, FIG. 4A and FIG. 4B are another schematic flowchart of a resource access method applied to a computer according to an embodiment of the present disclosure. In this embodiment of the present disclosure, the method includes the following steps.

Step S401. A processing unit generates an IO device access request based on a request of a virtual machine, where the IO device access request carries an IO device virtual address.

Further, when an application on the virtual machine needs to access an IO device, the processing unit generates an IO device access request, where the IO device access request carries an IO device virtual address, and the IO device virtual address represents an address, of the to-be-accessed IO device, presented in the virtual machine.

Step S402. The processing unit obtains, based on a preset processing unit mapping relationship, an identifier of a virtual machine associated with an identifier of the processing unit.

This step is the same as step S302.

Step S403. The processing unit adds the identifier of the virtual machine to the IO device access request.

This step is the same as step S303.

Step S404. The processing unit sends, to the IO device controller, an IO device access request obtained after the identifier of the virtual machine is added.

Reference may be made to descriptions of step S304.

Step S405. The IO device controller receives the IO device access request sent by the processing unit.

Further, the IO device is a hardware entity in a computer, and has a computing capability. The IO device may be built in a processor.

Step S406. The IO device controller finds, by querying a preset IO device mapping relationship, a device number of at least one IO device associated with the identifier of the virtual machine.

Further, the IO device mapping relationship represents a mapping relationship between an identifier of a virtual machine and a device number of at least one IO device allocated to the virtual machine. The device number represents an identity of an IO device, and each IO device has a different device number. The device mapping relationship may be represented in a form of a mapping table or a two-dimensional array, or in another form. For example, the IO device mapping relationship is shown in Table 4.

TABLE 4

| Identifier of a virtual machine | Device number of an IO device |
|---|---|
| ds-id1 | 1 |
|  | 2 |
| ds-id2 | 3 |
|  | 4 |

It may be learned, based on the IO device mapping relationship in Table 4, that two IO devices are allocated to a virtual machine represented by $ds\text{-}id_1$, and device numbers of the IO devices are 1 and 2, respectively. Two IO devices are allocated to a virtual machine $ds\text{-}id_2$, and device numbers of the IO devices are 3 and 4, respectively.

Step S407. The IO device controller obtains an IO device virtual address space associated with each of the device number of the at least one IO device.

Further, the IO device virtual address space represents an address range, of the IO device, presented in the virtual machine. Different IO devices have different IO device virtual address spaces. If a plurality of IO devices is allocated to one virtual machine, the virtual machine corresponds to a plurality of IO device virtual address spaces.

Optionally, that the IO device controller obtains an IO device virtual address space associated with each of the device number of the at least one IO device includes finding, by the IO device controller by querying the preset IO device address mapping relationship, an IO device virtual address space base address and an IO device virtual address space length that are associated with each of the device number of the at least one IO device, and determining, based on the IO device virtual address space base address and the IO device virtual address space length, the IO device virtual address space associated with each of the device number of the at least one IO device.

Further, for each of the at least one IO device allocated to the virtual machine, a corresponding IO device virtual address space base address is used as a minimum value of the IO device virtual address space, and a maximum value of the IO device virtual address space is obtained by summing the IO device virtual address space base address and the IO device virtual address space length.

For example, the IO device address mapping relationship is shown in Table 5.

TABLE 5

| Device number | IO device virtual address space base address | IO device virtual address space length | IO device physical address space base address |
|---|---|---|---|
| 1 | base1 | len1 | rebase1 |
| 2 | base2 | len2 | rebase2 |
| ... | ... | ... | ... |
| n | basen | lenn | Rebasen |

For an IO device with a device number n, the controller finds, by querying Table 5, that an IO device virtual address space base address associated with the device number n is $base_n$, and that an IO device virtual address space length associated with the device number n is $len_n$. In this case, an IO device virtual address space of the IO device is [$base_n$, $basen+len_n$].

Step S408. The IO device controller determines an IO device virtual address space in which the IO device virtual address is located, and sets a device number associated with the IO device virtual address space to a target device number.

Further, because the virtual machine is associated with at least one IO device, the virtual machine corresponds to a plurality of IO device virtual address spaces. The controller determines, based on the IO device virtual address carried in the IO device access request, in which one of the plurality of IO device virtual address spaces the IO device virtual address is located, and uses the device number associated with the IO device virtual address space in which the IO device virtual address is located as the target device number.

Step S409. The IO device controller finds, by querying a preset IO device address mapping relationship, an IO device virtual address space base address and an IO device physical address space base address that are associated with the target device number.

Step S410. The IO device controller translates the IO device virtual address into an IO device physical address based on the IO device virtual address space base address and the IO device physical address space base address.

Further, the IO device controller subtracts the IO device virtual address space base address from the IO device virtual address to obtain a difference, and sums the difference and the IO device physical space base address, to obtain the IO device physical address resulting from translation.

For example, the IO device address mapping relationship is shown in Table 5. It is assumed that the target device number determined in step S408 is 1, and that the IO device virtual address carried in the IO device access request is vaddr. The IO device controller finds, by querying Table 5, that the associated IO device virtual address space base address is $base_1$, and that the associated IO device physical address space base address is $rebase_1$. In this case, the IO device physical address resulting from translation is $paddr=vaddr-base_1+rebase_1$.

Step S411. The IO device controller updates the IO device virtual address in the IO device access request using the IO device physical address.

Step S412. The IO device controller sends an updated IO device access request to an IO device corresponding to the IO device physical address in order to access the IO device. The IO device corresponding to the IO device physical address is an IO device corresponding to the target device number in S408.

The following describes the resource access method applied to a computer in the present disclosure using a specific embodiment. An IO device mapping relationship is shown in Table 6.

TABLE 6

| Identifier of a virtual machine | Device number of an IO device |
| --- | --- |
| 2 | 0 |
|   | 2 |
| 3 | 1 |

An IO device address mapping relationship is shown in Table 7

TABLE 7

| Device number | IO device virtual address space base address | IO device virtual address space length | IO device physical address space base address |
| --- | --- | --- | --- |
| 0 | 0x40000000 | 0x1000 | 0x40000000 |
| 1 | 0x40000000 | 0x1000 | 0x40000000 |
| 2 | 0x400a0000 | 0x2000 | 0x400a2000 |

It is assumed that an IO device virtual address vaddr carried in an IO device access request is 0x40000234, and that an identifier of a virtual machine carried in the IO device access request is 2. The IO device controller finds, by querying Table 5 based on the virtual machine identifier, that a quantity of IO devices allocated to the virtual machine is two, and that device numbers are 0 and 2, respectively, and the IO device controller finds, by querying Table 7, IO device virtual address space base addresses and IO device physical address space base addresses corresponding to a device number 0 and a device number 2, respectively. In this way, it is obtained that an IO device virtual address space of an IO device corresponding to the device number 0 is [0x40000000, 0x40000000+0x1000], and that an IO device virtual address space of an IO device corresponding to the device number 2 is [0x40000000, 0x40000000+0x2000]. The IO device controller determines that the IO device virtual address is located in the IO device virtual address space of the device number 0. Therefore, the device number 0 is the target device number. The IO device controller determines, based on the IO device virtual address space base address 0x40000000 and the IO device physical address space base address 0x40000000 that are associated with the device number 0 in Table 7, that the IO device virtual address is paddr=0x40000234-0x40000000+0x40000000=0x40000234. The IO device updates an obtained IO device physical address into the IO device access request, and sends an updated IO device access request to an IO device corresponding to the device number 0.

Optionally, the resource information mapping relationship includes interrupt mapping information, and the method further includes receiving a physical interrupt request sent by any one of the at least one IO device allocated to the virtual machine, where the physical interrupt request carries a device number and a physical interrupt number of the IO device, finding, by querying the preset IO device mapping relationship, an identifier of a virtual machine associated with the device number, finding, by querying a preset interrupt mapping relationship, a virtual interrupt number associated with the physical interrupt number, updating, based on the virtual interrupt number, the physical interrupt number in the physical interrupt request, and sending an updated physical interrupt request to the virtual machine.

Further, the interrupt mapping information represents a mapping relationship between a virtual interrupt number of a virtual machine and a physical interrupt number of an IO device allocated to the virtual machine. The interrupt mapping relationship may be represented in a form of a mapping table or a two-dimensional array, or in another form. For example, the interrupt mapping relationship is shown in FIG. 8.

TABLE 8

| Identifier of a virtual machine | Virtual interrupt number | Physical interrupt number |
| --- | --- | --- |
| 2 | 1 | 0 |
|   | 3 | 2 |
|   | 4 | 1 |
|   | 2 | 4 |

It is assumed that an IO device sends a physical interrupt request with an interrupt number 0, and that the IO device controller receives the physical interrupt request, and finds, based on the IO device mapping relationship, that an identifier of a virtual machine bound to the IO device is 2. The IO device controller finds, based on the mapping relationship in Table 8, that a virtual interrupt number bound to the physical interrupt number 0 is 1. The IO device controller sends a physical interrupt request with the virtual interrupt number 1 to the virtual machine with the virtual machine identifier 2.

Optionally, the resource includes at least one IO device, the attribute information of the resource includes a physical interrupt number of the at least one IO device, and the resource information mapping relationship includes an interrupt mapping relationship.

Before the IO device controller receives the IO device access request sent by the processing unit, the generating, based on the identifier of the virtual machine and attribute information of the resource, a resource information mapping relationship includes the following steps.

The resource manager obtains a physical interrupt number of at least one IO device allocated to the virtual machine, and obtains the identifier and a virtual interrupt number of the virtual machine, and generates the interrupt mapping relationship based on the identifier of the virtual machine, the virtual interrupt number of the virtual machine, and the physical interrupt number of the at least one IO device.

Further, the resource manager pre-allocates at least one IO device to the virtual machine. An interrupt number, of the at least one IO device, presented in the virtual machine is a virtual interrupt number, and an interrupt number, of the at least one IO device, presented in the computer is a physical interrupt number. The resource manager binds the identifier of the virtual machine to the physical interrupt number of the virtual machine and the physical interrupt number of the at least one IO device, to generate the interrupt mapping information. For a form of the interrupt mapping information, refer to Table 8.

Optionally, the resource information mapping relationship includes an IO device address mapping relationship, and the step of generating, by the resource manager based on the identifier of the virtual machine and attribute information of the resource, a resource information mapping relationship further includes obtaining, by the resource manager, a device number corresponding to each of the at least one IO device, and binding the identifier of the virtual machine to the device number corresponding to each of the at least one IO device to generate the IO device mapping relationship, and obtaining, by the resource manager, a physical address space base address corresponding to each of the at least one IO device, and generating the TO device address mapping relationship, based on the identifier of the virtual machine, the IO device virtual address space base address of the virtual machine, the IO device virtual address space length of the virtual machine, and the IO device physical address space base address corresponding to each one of the at least one IO device.

For the IO device mapping relationship, refer to Table 6, and for the IO device address mapping relationship, refer to Table 7. These are not described herein again.

Figure 5:
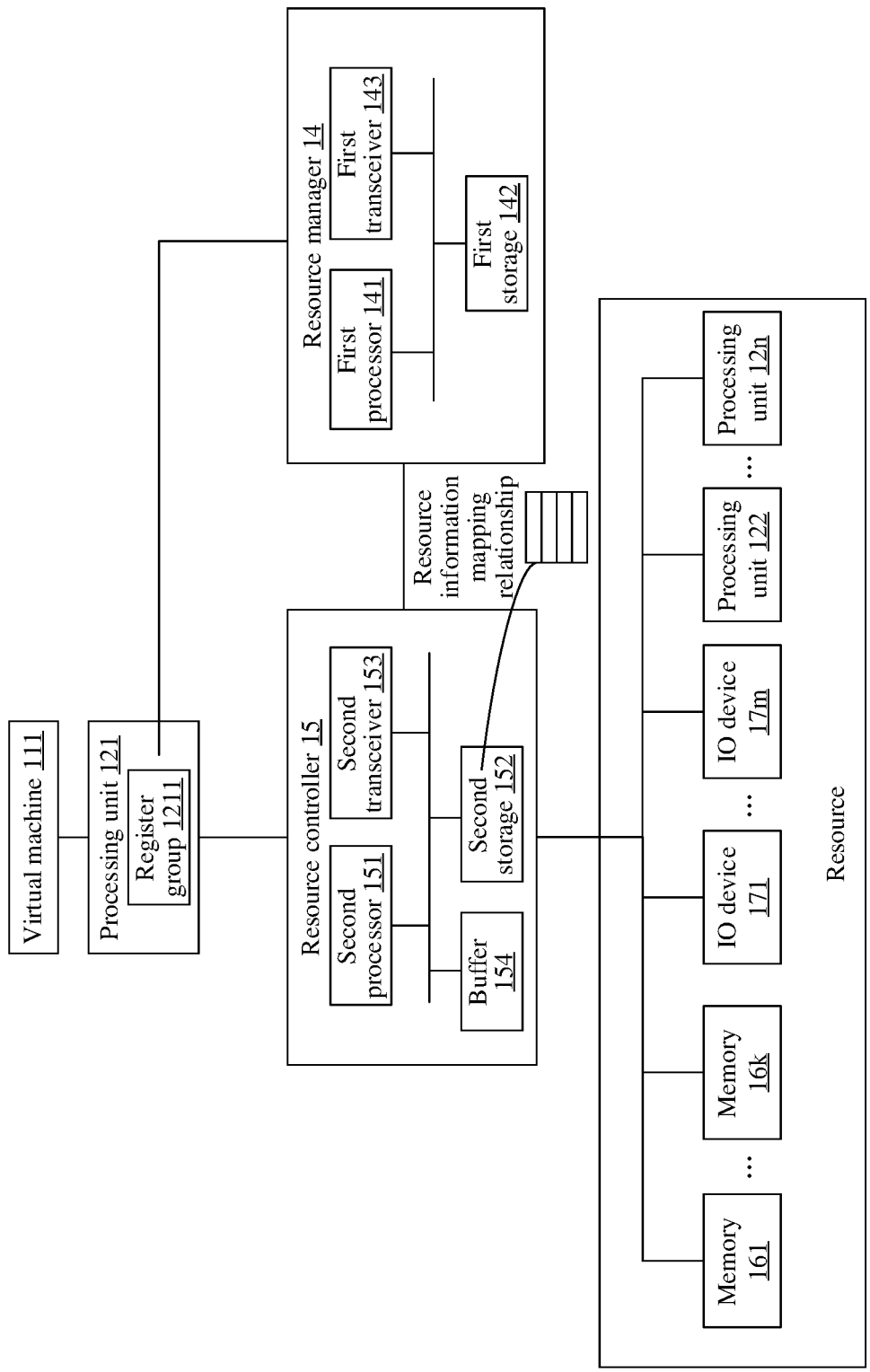
FIG. 5 is another schematic structural diagram of a computer according to an embodiment of the present disclosure.

Referring to FIG. 5, FIG. 5 is another schematic structural diagram of a computer according to an embodiment of the present disclosure. In this embodiment of the present disclosure, the computer includes a resource manager 14, a resource controller 15, and a resource. The resource includes one or more memories 161 to 16k, one or more processing units 121 to 12n, and one or more IO devices 171 to 17m, where m, n, and k are integers greater than 0.

The resource manager 14 selects a physical resource from the resource, and creates a virtual machine 111 based on the selected physical resource, allocates an identifier to the virtual machine 111, generates, based on the identifier of the virtual machine 111 and attribute information of the selected physical resource, a resource information mapping relationship, and sends the resource information mapping relationship to the resource controller 15, and the resource controller 15 is configured to receive a resource access request of the virtual machine 111 for the resource, where the resource access request carries a resource virtual address and the identifier of the virtual machine 111, translate the resource virtual address into a resource physical address using the identifier of the virtual machine 111 and based on the resource information mapping relationship, update the resource virtual address in the resource access request using the resource physical address, and send an updated resource access request to a to-be-accessed resource corresponding to the resource physical address in order to access the to-be-accessed resource.

Further, the resource manager 14 includes a first processor 141, a first transceiver 143, and a first storage 142. A quantity of first processors 141 in the resource manager 14 may be one or more. In some embodiments of the present disclosure, the first processor 141, the first storage 142, and the first transceiver 143 may be connected using a bus system or in another manner. The first processor 141, the first storage 142, and the first transceiver 143 may be connected in a wired manner, or may communicate in another way, for example, through wireless transmission. The first transceiver 143 is configured to receive an instruction or data sent by an external device, and send an instruction or data to an external device. The first storage 142 stores program code. The resource controller 15 includes a second processor 151, a second transceiver 153, a second storage 152, and a buffer 154. A quantity of second processors 151 in the resource controller 15 may be one or more. In some embodiments of the present disclosure, the second processor 151, the second storage 152, the second transceiver 153, and the buffer 154 may be connected using a bus system or in another manner. The second processor 151, the second storage 152, the second transceiver 153, and the buffer 154 may be connected in a wired manner, or may communicate in another way, for example, through wireless transmission. The second transceiver 153 is configured to receive an instruction or data sent by an external device, and send an instruction or data to an external device. The buffer 154 has a buffering function. The second storage 153 stores program code.

This embodiment is based on a same concept as the method embodiments of FIG. 2 to FIG. 4B. For a specific progress and related technical terms, refer to the descriptions of FIG. 2 to FIG. 4B, and details are not further described herein.

It should be noted that the first processor 141 and the second processor 151 may be implemented using an application-specific integrated circuit (ASIC), or implemented using a programmable logic device (PLD). The PLD may be a complex PLD (CPLD), a field programmable gate array (FPGA), a generic array logic (GAL), or any combination thereof.

The first processor 141 invokes the program code stored in the first storage 142, and the first processor 141 is configured to select the physical resource from the resource, where the physical resource includes a processing unit 121, create the virtual machine 111 based on the selected physical resource, where the processing unit 121 and the virtual machine 111 have a binding relationship, allocate the identifier to the virtual machine 111, generate, based on the identifier of the virtual machine 111 and the attribute information of the physical resource, the resource information mapping relationship, and store the resource information mapping relationship into the first storage 142.

The first transceiver 143 is configured to send the resource information mapping relationship to the buffer 154 of the resource controller 15. The resource controller 15 may send the resource information mapping relationship to the processing unit 121, and the resource manager 14 may directly send the resource information mapping relationship to the processing unit 121. This is not limited in the present disclosure.

The second processor 151 invokes the program code stored in the second storage 152, and the second processor 151 is configured to fetch the resource information mapping relationship from the buffer 154, and store the resource information mapping relationship into the second storage 152.

The buffer 154 receives the resource access request sent by the processing unit 121, where the resource access request carries the resource virtual address and the identifier of the virtual machine 111.

The second processor 151 is further configured to fetch the resource access request from the buffer 154, translate the resource virtual address into the resource physical address using the identifier of the virtual machine 111 and based on the resource information mapping relationship stored in the second storage 152, and update the resource virtual address in the resource access request using the resource physical address.

The second transceiver 153 sends the updated resource access request to the to-be-accessed resource corresponding to the resource physical address in order to access the to-be-accessed resource.

In a possible implementation, the first processor 141 sends a processing unit mapping relationship included in the resource information mapping relationship to the processing unit 121. The processing unit 121 stores the processing unit mapping relationship into an internal register group 1211. The processing unit 121 generates the resource access request based on a request of the virtual machine, where the resource access request carries the resource virtual address, obtains, based on the processing unit mapping relationship stored in the register group 1211, an identifier of a virtual machine 111 associated with an identifier of the processing unit 121, adds the identifier of the virtual machine 111 to the resource access request, and sends to the buffer 154, a resource access request obtained after the identifier of the virtual machine 111 is added.

In a possible implementation, the resource controller 15 is a memory controller, the resource virtual address is a memory virtual address, the resource physical address is a memory physical address, the to-be-accessed resource is a memory, and the resource information mapping relationship includes a memory address mapping relationship.

The second processor 151 includes a first controller and a first operator.

The first controller finds, by querying the memory address mapping relationship stored in the second storage 152, a memory virtual address space base address and a memory physical address space base address that are associated with the identifier of the virtual machine.

The first operator obtains a memory physical address based on the memory virtual address, the memory virtual address space base address, and the memory physical address space base address.

In a possible implementation, the first operator is further configured to translate the memory virtual address into the memory physical address based on a formula, paddr=vaddr−base+rebase, where paddr is the memory physical address, vaddr is the memory virtual address, base is the memory virtual address space base address, and rebase is the memory physical address space base address.

In a possible implementation, the resource controller 15 is an IO device controller, the resource virtual address is an IO device virtual address, the resource physical address is an IO device physical address, the to-be-accessed resource is an IO device, and the resource information mapping relationship includes an IO device mapping relationship and an IO device address mapping relationship.

The second processor 151 includes a second controller and a second operator.

The second controller finds, by querying the IO device mapping relationship stored in the second storage 152, a device number of at least one IO device associated with the identifier of the virtual machine 111, finds, by querying the IO device address mapping relationship stored in the second storage 152, an IO device virtual address space base address and an IO device virtual address space length that are associated with each of the device number of the at least one IO device, determines, based on the IO device virtual address space base address and the IO device virtual address space length, an IO device virtual address space associated with each of the device number of the at least one IO device, determines an IO device virtual address space in which the IO device virtual address is located, and sets a device number associated with the IO device virtual address space to a target device number, and finds, by querying the preset IO device address mapping relationship, an IO device virtual address space base address and an IO device physical address space base address that are associated with the target device number.

The second operator translates the IO device virtual address into an IO device physical address based on the IO device virtual address space base address and the IO device physical address space base address.

In a possible implementation, the second operator is further configured to translate the IO device virtual address into the IO device physical address based on a formula, paddr=vaddr−base+rebase, where paddr is the IO device physical address, vaddr is the IO device virtual address, base is the IO device virtual address space base address, and rebase is the IO device physical address space base address.

In a possible design, the resource information mapping relationship includes an interrupt mapping relationship, and the IO device controller further includes an interrupt controller, where the buffer 154 is configured to receive a physical interrupt request sent by any one of the at least one IO device, where the physical interrupt request carries a device number and a physical interrupt number of the IO device, and the interrupt controller finds, by querying the IO device mapping relationship stored in the second storage 152, an identifier of a virtual machine associated with the device number, finds, by querying the interrupt mapping relationship stored in the second storage 152, a virtual interrupt number associated with the physical interrupt number, updates, based on the virtual interrupt number, the physical interrupt number in the physical interrupt request, and sends an updated physical interrupt request to the virtual machine 111.

In a possible implementation, the physical resource includes a processing unit 121, and the attribute information of the physical resource includes an identifier of the processing unit 121.

The first processor 141 is configured to generate, based on the identifier of the virtual machine 111 and the identifier of the processing unit 121, a processing unit mapping relationship, and store the processing unit mapping relationship into a register group 1211 of the processing unit 121.

In a possible implementation, the physical resource includes a memory, the attribute information of the physical resource includes a memory physical address space base address of a physical address space of the memory, and the resource information mapping relationship includes a memory address mapping relationship, and the first processor 141 is further configured to obtain a memory physical address space base address allocated to the virtual machine 111, and obtain a memory virtual address space base address of the virtual machine 111, generate the memory address mapping relationship based on the identifier of the virtual machine 111, the memory virtual address space base address, and the physical address space base address, and store the memory address mapping relationship into the first storage 142.

In a possible implementation, the physical resource includes at least one IO device, the attribute information of the physical resource includes a physical interrupt number of the at least one IO device, and the resource information mapping relationship includes the interrupt mapping relationship, and the first processor 141 is configured to obtain a physical interrupt number of at least one IO device allocated to the virtual machine 111, and obtain the identifier and a virtual interrupt number of the virtual machine 111, generate the interrupt mapping relationship based on the identifier of the virtual machine 111, the virtual interrupt number of the virtual machine 111, and the physical interrupt number of the at least one IO device, and store the interrupt mapping relationship into the first storage 142.

In a possible implementation, the resource information mapping relationship includes an IO device address mapping relationship, and the first processor 141 is further configured to obtain a device number corresponding to each of at least one IO device, and bind the identifier of the virtual machine to the device number corresponding to each of the at least one IO device to generate an IO device mapping relationship, obtain a physical address space base address corresponding to each of the at least one IO device, and generate the IO device address mapping relationship, based on the identifier of the virtual machine 111, the IO device virtual address space base address of the virtual machine 111, the IO device virtual address space length of the virtual machine 111, and the IO device physical address space base address corresponding to each of the at least one IO device, and store the IO device address mapping relationship into the first storage 142.

In the foregoing embodiment, the resource controller receives the resource access request of the virtual machine for the resource, and translates the resource virtual address into the resource physical address using the identifier of the virtual machine carried in the resource access request and based on the resource information mapping relationship. In this way, compared with implementing resource virtualization using the existing software-based method, implementing a resource virtualization function using the computing capability of the resource controller itself saves intermediate layer processing, improves running performance of the virtual machine, and reduces physical resource occupation such that more physical resources can be allocated to the virtual machine.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely example embodiments of the present disclosure, and certainly is not intended to limit the protection scope of the present disclosure. A person of ordinary skill in the art may understand that all or some of processes that implement the foregoing embodiment and equivalent modifications made in accordance with the claims of the present disclosure shall fall within the scope of the present disclosure.

What is claimed is:

1. A resource access method, the resource access method being applied to a computer comprising a resource, a resource controller, and a resource manager, wherein the resource access method comprises: comprising:
   selecting, by the resource manager, a physical resource from the resource;
   creating, by the resource manager, a virtual machine based on the physical resource;
   allocating, by the resource manager, an identifier to the virtual machine;
   generating, by the resource manager based on the identifier of the virtual machine and attribute information of the physical resource, a resource information mapping relationship;
   sending, by the resource manager, the resource information mapping relationship to the resource controller;
   receiving, by the resource controller, a resource access request of the virtual machine for the resource, wherein the resource access request carries a resource virtual address and the identifier of the virtual machine, and wherein the virtual machine runs on the computer;
   translating, by the resource controller, the resource virtual address into a resource physical address using the identifier of the virtual machine and based on the resource information mapping relationship;
   updating, by the resource controller, the resource virtual address in the resource access request using the resource physical address; and
   sending, by the resource controller, an updated resource access request to a to-be-accessed resource corresponding to the resource physical address in order to access the to-be-accessed resource.

2. The resource access method of claim 1, wherein the resource comprises a processor, and wherein before receiving the resource access request for the resource, the resource access method further comprises:
   generating, by the processor based on a request of the virtual machine, the resource access request, wherein the resource access request carries the resource virtual address;
   obtaining, by the processor based on a processor mapping relationship, the identifier of the virtual machine associated with an identifier of the processor, wherein the processor mapping relationship comprises a correspondence between the identifier of the virtual machine and the identifier of the processor;
   adding, by the processor, the identifier of the virtual machine to the resource access request; and
   sending, by the processor to the resource controller, a resource access request obtained after the identifier of the virtual machine is added.

3. The resource access method of claim 1, wherein the resource controller is a memory controller, wherein the resource virtual address is a memory virtual address, wherein the resource physical address is a memory physical address, wherein the to-be-accessed resource is a memory, wherein the resource information mapping relationship comprises a memory address mapping relationship, and wherein translating the resource virtual address into the resource physical address comprises:
- finding, by the memory controller by querying the memory address mapping relationship, a memory virtual address space base address and a memory physical address space base address associated with the identifier of the virtual machine; and
- obtaining, by the memory controller, the memory physical address based on the memory virtual address, the memory virtual address space base address, and the memory physical address space base address.

4. The resource access method of claim 1, wherein the resource controller is an input/output (TO) device controller, wherein the resource virtual address is an IO device virtual address, wherein the resource physical address is an IO device physical address, wherein the to-be-accessed resource is an IO device, wherein the resource information mapping relationship comprises an IO device mapping relationship and an IO device address mapping relationship, and wherein translating the resource virtual address into the resource physical address comprises:
- finding, by the IO device controller by querying the IO device mapping relationship, a device number of at least one IO device associated with the identifier of the virtual machine;
- obtaining, by the IO device controller, an IO device virtual address space associated with each of the device number of the at least one IO device;
- determining, by the IO device controller, an IO device virtual address space in which the IO device virtual address is located;
- setting, by the IO device controller, a device number associated with the IO device virtual address space in which the IO device virtual address is located to a target device number;
- finding, by the IO device controller by querying the IO device address mapping relationship, an IO device virtual address space base address and an IO device physical address space base address associated with the target device number; and
- translating, by the IO device controller, the IO device virtual address into the IO device physical address based on the IO device virtual address space base address and the IO device physical address space base address.

5. The resource access method of claim 4, wherein obtaining the IO device virtual address space associated with each of the device number of the at least one IO device comprises:
- finding, by the IO device controller by querying the IO device address mapping relationship, an IO device virtual address space base address and an IO device virtual address space length associated with each of the device number of the at least one IO device; and
- determining, by the IO device controller based on the IO device virtual address space base address and the IO device virtual address space length, the IO device virtual address space associated with each of the device number of the at least one IO device.

6. The resource access method of claim 4, wherein the resource information mapping relationship further comprises an interrupt mapping relationship, and wherein the resource access method further comprises:
- receiving, by the IO device controller, a physical interrupt request from any one of the at least one IO device, wherein the physical interrupt request carries a device number and a physical interrupt number of the any one of the at least one IO device;
- finding, by the IO device controller by querying the IO device mapping relationship, an identifier of a virtual machine associated with the device number of the any one of the at least one IO device;
- finding, by the IO device controller by querying the interrupt mapping relationship, a virtual interrupt number associated with the physical interrupt number of the any one of the at least one IO device;
- updating, by the IO device controller based on the virtual interrupt number, the physical interrupt number in the physical interrupt request; and
- sending, by the IO device controller, an updated physical interrupt request to the virtual machine associated with the device number of the any one of the at least one IO device.

7. The resource access method of claim 1, wherein the resource comprises a processor, wherein the attribute information of the physical resource comprises an identifier of the processor, and wherein the resource access method further comprises:
- generating, by the resource manager based on the identifier of the virtual machine and the attribute information of the physical resource, the resource information mapping relationship; and
- generating, by the resource manager, a processor mapping relationship based on the identifier of the virtual machine and the identifier of the processor.

8. The resource access method of claim 1, wherein the physical resource comprises a memory, wherein the attribute information of the physical resource comprises a memory physical address space base address of a physical address space of the memory, wherein the resource information mapping relationship comprises a memory address mapping relationship, and wherein generating the resource information mapping relationship comprises:
- obtaining, by the resource manager, a memory physical address space base address allocated to the virtual machine;
- obtaining, by the resource manager, a memory virtual address space base address of the virtual machine; and
- generating, by the resource manager, the memory address mapping relationship based on the identifier of the virtual machine, the memory virtual address space base address, and the memory physical address space base address.

9. The resource access method of claim 1, wherein the physical resource comprises at least one input/output (TO) device, wherein the attribute information of the physical resource comprises a physical interrupt number of the at least one IO device, wherein the resource information mapping relationship comprises an interrupt mapping relationship, and wherein generating the resource information mapping relationship comprises:
- obtaining, by the resource manager, a physical interrupt number of at least one IO device allocated to the virtual machine;
- obtaining, by the resource manager, the identifier and a virtual interrupt number of the virtual machine; and generating, by the resource manager, the interrupt mapping relationship based on the identifier of the virtual machine, the virtual interrupt number of the virtual machine, and the physical interrupt number of the at least one IO device allocated to the virtual machine.

10. A computer, comprising:
a resource;
a resource controller coupled to the resource; and
a resource manager coupled to the resource and the resource controller and configured to:
  select a physical resource from the resource;
  create a virtual machine based on the physical resource;
  allocate an identifier to the virtual machine;
  generate, based on the identifier of the virtual machine and attribute information of the physical resource, a resource information mapping relationship; and
  send the resource information mapping relationship to the resource controller, and wherein the resource controller is configured to:
  receive a resource access request of the virtual machine for the resource, wherein the resource access request carries a resource virtual address and the identifier of the virtual machine;
  translate the resource virtual address into a resource physical address using the identifier of the virtual machine and based on the resource information mapping relationship;
  update the resource virtual address in the resource access request using the resource physical address; and
  send an updated resource access request to a to-be-accessed resource corresponding to the resource physical address in order to access the to-be-accessed resource.

11. The computer of claim 10, wherein the resource manager comprises a first processor, a first storage, and a first transceiver, wherein the resource controller comprises a second processor, a second storage, a second transceiver, and a buffer, wherein the resource comprises a processor, a memory, or an input/output (TO) device, and wherein the first processor is configured to:
  select the physical resource from the resource;
  create the virtual machine based on the physical resource;
  allocate the identifier to the virtual machine;
  generate, based on the identifier of the virtual machine and the attribute information of the physical resource, the resource information mapping relationship; and
  store the resource information mapping relationship into the first storage,
wherein the first transceiver is configured to send the resource information mapping relationship to the buffer,
wherein the second processor is configured to:
  fetch the resource information mapping relationship from the buffer; and
  store the resource information mapping relationship into the second storage,
wherein the buffer is configured to receive the resource access request from the virtual machine for the resource,
wherein the resource access request carries carrying the resource virtual address and the identifier of the virtual machine,
wherein the second processor is further configured to:
  fetch the resource access request from the buffer;
  translate the resource virtual address into the resource physical address using the identifier of the virtual machine and based on the resource information mapping relationship stored in the second storage; and
  update the resource virtual address in the resource access request using the resource physical address, and
wherein the second transceiver is configured to send the updated resource access request to the to-be-accessed resource corresponding to the resource physical address in order to access the to-be-accessed resource.

12. The computer of claim 11, wherein the processor comprises a register group, wherein the register group stores a processor mapping relationship, wherein the processor mapping relationship comprises a correspondence between the identifier of the virtual machine and an identifier of the processor, and wherein the processor is configured to:
  generate the resource access request based on a request of the virtual machine, wherein the resource access request carries the resource virtual address;
  obtain, based on the processor mapping relationship stored in the register group, the identifier of the virtual machine associated with the identifier of the processor;
  add the identifier of the virtual machine to the resource access request; and
  send, to the buffer, a resource access request obtained after the identifier of the virtual machine is added.

13. The computer of claim 12, wherein the physical resource comprises the processor, wherein the attribute information of the physical resource comprises the identifier of the processor, and wherein the first processor is further configured to:
  generate the processor mapping relationship based on the identifier of the virtual machine and the identifier of the processor; and
  store the processor mapping relationship into the register group of the processor.

14. The computer of claim 13, wherein the physical resource comprises at least one IO device, wherein the attribute information of the physical resource comprises a physical interrupt number of the at least one IO device, wherein the resource information mapping relationship comprises an interrupt mapping relationship, and wherein the first processor is configured to:
  obtain a physical interrupt number of at least one IO device allocated to the virtual machine;
  obtain the identifier and a virtual interrupt number of the virtual machine;
  generate the interrupt mapping relationship based on the identifier of the virtual machine, the virtual interrupt number of the virtual machine, and the physical interrupt number of the at least one IO device allocated to the virtual machine; and
  store the interrupt mapping relationship into the first storage.

15. The computer of claim 11, wherein the resource controller is a memory controller, wherein the resource virtual address is a memory virtual address, wherein the resource physical address is a memory physical address, wherein the to-be-accessed resource is the memory, wherein the resource information mapping relationship comprises a memory address mapping relationship, and wherein the second processor comprises:
  a first controller configured to find, by querying the memory address mapping relationship stored in the second storage, a memory virtual address space base address and a memory physical address space base address associated with the identifier of the virtual machine; and a first operator configured to obtain the memory physical address based on the memory virtual address, the memory virtual address space base address, and the memory physical address space base address.

16. The computer of claim 15, wherein the physical resource comprises the memory, wherein the attribute information of the physical resource comprises a memory physical address space base address of a physical address space of the memory, wherein the resource information mapping relationship comprises the memory address mapping relationship, and wherein the first processor is further configured to:

obtain a memory physical address space base address allocated to the virtual machine;

obtain a memory virtual address space base address of the virtual machine;

generate the memory address mapping relationship based on the identifier of the virtual machine, the memory virtual address space base address, and the memory physical address space base address; and store the memory address mapping relationship into the first storage.

17. The computer of claim 11, wherein the resource controller is an IO device controller, wherein the resource virtual address is an IO device virtual address, wherein the resource physical address is an IO device physical address, wherein the to-be-accessed resource is the IO device, wherein the resource information mapping relationship comprises an IO device mapping relationship and an IO device address mapping relationship, and wherein the second processor comprises:

a second controller configured to:

find, by querying the IO device mapping relationship stored in the second storage, a device number of at least one IO device associated with the identifier of the virtual machine;

find, by querying the IO device address mapping relationship stored in the second storage, an IO device virtual address space base address and an IO device virtual address space length associated with each of the device number of the at least one IO device;

determine, based on the IO device virtual address space base address and the IO device virtual address space length, an IO device virtual address space associated with each of the device number of the at least one IO device;

determine an IO device virtual address space in which the IO device virtual address is located;

set a device number associated with the IO device virtual address space in which the IO device virtual address is located to a target device number; and find, by querying the IO device address mapping relationship, an IO device virtual address space base address and an IO device physical address space base address associated with the target device number, and a second operator configured to translate the IO device virtual address into the IO device physical address based on the IO device virtual address space base address and the IO device physical address space base address associated with the target device number.

18. The computer of claim 17, wherein the resource information mapping relationship comprises an interrupt mapping relationship, wherein the IO device controller further comprises an interrupt controller, wherein the buffer is further configured to receive a physical interrupt request from any one of the at least one IO device, wherein the physical interrupt request carries a device number and a physical interrupt number of the any one of the at least one IO device, and wherein the interrupt controller is configured to:

find, by querying the IO device mapping relationship stored in the second storage, an identifier of a virtual machine associated with the device number of the any one of the at least one IO device;

find, by querying the interrupt mapping relationship stored in the second storage, a virtual interrupt number associated with the physical interrupt number of the any one of the at least one IO device;

update, based on the virtual interrupt number, the physical interrupt number in the physical interrupt request; and send an updated physical interrupt request to the virtual machine associated with the device number of the any one of the at least one IO device.

19. The computer of claim 17, wherein the resource information mapping relationship comprises the IO device address mapping relationship, and wherein the first processor is further configured to:

obtain a device number corresponding to each of the at least one IO device;

bind the identifier of the virtual machine to the device number corresponding to each of the at least one IO device to generate the IO device mapping relationship;

obtain a physical address space base address corresponding to each of the at least one IO device;

generate the IO device address mapping relationship, based on the identifier of the virtual machine, the IO device virtual address space base address of the virtual machine, the IO device virtual address space length of the virtual machine, and the IO device physical address space base address corresponding to each of the at least one IO device; and store the IO device address mapping relationship into the first storage.

20. A computer program product comprising computer-executable instructions for storage on a non-transitory computer-readable medium that, when executed by a processor, cause a computer to:

select, by a resource manager, a physical resource from a resource;

create, by the resource manager, a virtual machine based on the physical resource;

allocate, by the resource manager, an identifier to the virtual machine;

generate, by the resource manager based on the identifier of the virtual machine and attribute information of the physical resource, a resource information mapping relationship;

send, by the resource manager, the resource information mapping relationship to a resource controller;

receive, by the resource controller, a resource access request of the virtual machine for the resource, wherein the resource access request carries a resource virtual address and the identifier of the virtual machine, and wherein the virtual machine runs on the computer;

translate, by the resource controller, the resource virtual address into a resource physical address using the identifier of the virtual machine and based on the resource information mapping relationship;

update, by the resource controller, the resource virtual address in the resource access request using the resource physical address; and send, by the resource controller, an updated resource access request to a to-be-accessed resource corresponding to the resource physical address in order to access the to-be-accessed resource.

\* \* \* \* \*

UNITED STATES PATENT AND TRADEMARK OFFICE
CERTIFICATE OF CORRECTION

PATENT NO. : 10,970,104 B2  Page 1 of 1
APPLICATION NO. : 16/251883
DATED : April 6, 2021
INVENTOR(S) : Zihao Yu, Jiuyue Ma and Yungang Bao It is certified that error appears in the above-identified patent and that said Letters Patent is hereby corrected as shown below:

On the Title Page

Page 2, Item (56) References Cited, Other Publications: "Mar. 14-18, 2015, pp. 131-141" should read "Mar. 14-18, 2015, pp. 131-143"

In the Claims

Claim 4, Column 31, Line 21: "input/output (TO)" should read "input/output (IO)"

Claim 8, Column 32, Line 56: "input/output (TO)" should read "input/output (IO)"

Claim 11, Column 33, Line 40: "input/output (TO)" should read "input/output (IO)"

Claim 11, Column 33, Line 61: "request carries carrying the" should read "request carries the"

Signed and Sealed this
First Day of June, 2021

Drew Hirshfeld
*Performing the Functions and Duties of the
Under Secretary of Commerce for Intellectual Property and
Director of the United States Patent and Trademark Office*